US009346706B2

(12) United States Patent
Bazemore et al.

(10) Patent No.: US 9,346,706 B2
(45) Date of Patent: May 24, 2016

(54) METHODS OF FABRICATING GLASS ARTICLES BY LASER DAMAGE AND ETCHING

(71) Applicant: Corning Incorporated, Corning, NY (US)

(72) Inventors: Brandon A. Bazemore, Big Flats, NY (US); Jeffrey A. Decker, Horseheads, NY (US); Jiangwei Feng, Painted Post, NY (US); Diane Kimberlie Guilfoyle, Painted Post, NY (US); Daniel Ralph Harvey, Beaver Dams, NY (US); Yuhui Jin, Painted Post, NY (US); Laurent Joubaud, Paris (FR); Xavier Lafosse, Corning, NY (US); Alexander Mikhailovich Streltsov, Corning, NY (US); Ljerka Ukrainczyk, Painted Post, NY (US)

(73) Assignee: CORNING INCORPORATED, Corning, NY (US)

(*) Notice: Subject to any disclaimer, the term of this patent is extended or adjusted under 35 U.S.C. 154(b) by 101 days.

(21) Appl. No.: 14/092,544

(22) Filed: Nov. 27, 2013

(65) Prior Publication Data
US 2014/0147624 A1 May 29, 2014

Related U.S. Application Data

(60) Provisional application No. 61/731,013, filed on Nov. 29, 2012.

(51) Int. Cl.
C03C 15/00 (2006.01)
C03B 23/00 (2006.01)
(Continued)

(52) U.S. Cl.
CPC ............ *C03C 15/00* (2013.01); *B23K 26/0006* (2013.01); *B23K 26/0057* (2013.01);
(Continued)

(58) Field of Classification Search
USPC ............................................................. 65/31
IPC ................................. C03C 15/00,21/00, 23/00
See application file for complete search history.

(56) References Cited

U.S. PATENT DOCUMENTS 6,143,382 A * 11/2000 Koyama et al. ............. 428/34.4
6,754,429 B2 6/2004 Borrelli et al.
(Continued)

FOREIGN PATENT DOCUMENTS

DE 102010003817 A1 10/2011
EP 1164113 A1 12/2001
(Continued)

OTHER PUBLICATIONS

Final Office Action dated Jun. 15, 2015 relating to U.S. Appl. No. 13/800,033, filed Mar. 13, 2013.
(Continued)

*Primary Examiner* — Mark Halpern
(74) *Attorney, Agent, or Firm* — John T. Haran

(57) ABSTRACT

Methods of forming a glass article are disclosed. In one embodiment, a method of forming a glass article includes translating a pulsed laser beam on a glass substrate sheet to form a laser damage region between a first surface and a second surface of the glass substrate sheet. The method further includes applying an etchant solution to the glass substrate sheet to remove a portion of the glass substrate sheet about the laser damage region. The method may further include strengthening the glass substrate sheet by an ion-exchange strengthening process, and coating the glass substrate sheet with an acid-resistant coating. Also disclosed are methods where the laser damage region has an initial geometry that changes to a desired geometry following the reforming of the glass substrate sheet such that the initial geometry of the laser damage region compensates for the bending of the glass substrate sheet.

26 Claims, 14 Drawing Sheets

(51) Int. Cl.
*C03C 21/00* (2006.01)
*C03C 23/00* (2006.01)
*C03C 3/083* (2006.01)
*C03C 3/085* (2006.01)
*C03C 3/091* (2006.01)
*C03C 3/097* (2006.01)
*B23K 26/00* (2014.01)
*B23K 26/38* (2014.01)
*B23K 26/36* (2014.01)
*B23K 26/40* (2014.01)
*C03B 23/023* (2006.01)
*C03B 23/025* (2006.01)
*C03B 23/03* (2006.01)
*C03B 23/035* (2006.01)

(52) U.S. Cl.
CPC ............ *B23K26/082* (2015.10); *B23K 26/362* (2013.01); *B23K 26/38* (2013.01); *B23K 26/40* (2013.01); *C03B 23/0066* (2013.01); *C03C 3/083* (2013.01); *C03C 3/085* (2013.01); *C03C 3/091* (2013.01); *C03C 3/097* (2013.01); *C03C 21/00* (2013.01); *C03C 21/002* (2013.01); *C03C 23/0025* (2013.01); *B23K 2201/18* (2013.01); *B23K 2201/40* (2013.01); *B23K 2203/00* (2013.01); *B23K 2203/50* (2015.10); *C03B 23/023* (2013.01); *C03B 23/025* (2013.01); *C03B 23/0235* (2013.01); *C03B 23/03* (2013.01); *C03B 23/0352* (2013.01); *C03C 2218/34* (2013.01); *C03C 2218/355* (2013.01); *Y10T 428/24331* (2015.01)

(56) References Cited

U.S. PATENT DOCUMENTS

| | | | |
|---|---|---|---|
| 7,033,519 B2 * | 4/2006 | Taylor et al. | 216/87 |
| 7,057,135 B2 * | 6/2006 | Li | 219/121.83 |
| 7,836,727 B2 | 11/2010 | Nishiyama | |
| 8,307,672 B2 | 11/2012 | Hidaka et al. | |
| 8,327,666 B2 | 12/2012 | Harvey et al. | |
| 8,341,976 B2 | 1/2013 | Dejneka et al. | |
| 2004/0188393 A1 * | 9/2004 | Li et al. | 219/121.7 |
| 2005/0029238 A1 | 2/2005 | Chen | |
| 2006/0207976 A1 | 9/2006 | Bovatsek et al. | |
| 2008/0314883 A1 * | 12/2008 | Juodkazis et al. | 219/121.72 |
| 2009/0013724 A1 * | 1/2009 | Koyo et al. | 65/31 |
| 2010/0000259 A1 | 1/2010 | Ukrainczyk et al. | |
| 2010/0050692 A1 | 3/2010 | Logunov | |
| 2010/0080961 A1 | 4/2010 | Okamura et al. | |
| 2010/0119846 A1 | 5/2010 | Sawada | |
| 2010/0206008 A1 | 8/2010 | Harvey et al. | |
| 2010/0289186 A1 | 11/2010 | Longo et al. | |
| 2011/0003619 A1 | 1/2011 | Fujii | |
| 2011/0187025 A1 | 8/2011 | Costin, Sr. | |
| 2011/0256344 A1 * | 10/2011 | Ono et al. | 428/131 |
| 2011/0300908 A1 | 12/2011 | Grespan | |
| 2012/0013196 A1 | 1/2012 | Kim et al. | |
| 2012/0048604 A1 | 3/2012 | Cornejo | |
| 2012/0135177 A1 | 5/2012 | Cornejo et al. | |
| 2012/0196071 A1 | 8/2012 | Cornejo et al. | |
| 2012/0261697 A1 * | 10/2012 | Margalit et al. | 257/98 |
| 2013/0209731 A1 * | 8/2013 | Nattermann et al. | 428/131 |
| 2013/0247615 A1 | 9/2013 | Boek et al. | |

FOREIGN PATENT DOCUMENTS

| | | |
|---|---|---|
| EP | 2020273 A1 | 2/2009 |
| EP | 2253414 A1 | 11/2010 |
| JP | H03252384 A | 11/1991 |
| JP | 4349132 A | 12/1992 |
| JP | 2000301372 A | 10/2000 |
| JP | 2002028799 A | 1/2002 |
| JP | 2011143434 A | 7/2011 |
| KR | 20110046953 A | 5/2011 |
| WO | 2001033621 A2 | 5/2001 |

OTHER PUBLICATIONS

International Preliminary Report on Patentability dated Jun. 11, 2015 relating to PCT/US2013/072346 filed Nov. 27, 2013.
International Preliminary Report on Patentability dated Jun. 11, 2015 relating to PCT/US2013/072342 filed Nov. 27, 2013.
International Search Report & Written Opinion mailed May 14, 2014 for International Patent Application No. PCT/US2013/072346 filed Nov. 27, 2013.
Madehow.com, Liquid Crystal Display (LCD), Jan. 29, 2006, https://web.archive.org/web/20060129092154/http://www.madehow.com/Volume-1/Liquid-Crystal-Display-LCD.html; pp. 1-6.
International Search Report and Written Opinion, Application No. PCT/US2013/072342 filed Nov. 27, 2013, mailed Feb. 7, 2014.
International Search Report and Written Opinion, Application No. PCT/US2013/035195 filed Apr. 4, 2013, mailed Apr. 9, 2014.
Mukhina L., Laser Pulse Damage on the Surface of Ion Exchange Treated Glass, Soviet Journal of Glass physics and Chemistry, vol. 19, No. 3, pp. 269-272, Jun. 1, 1993.

* cited by examiner

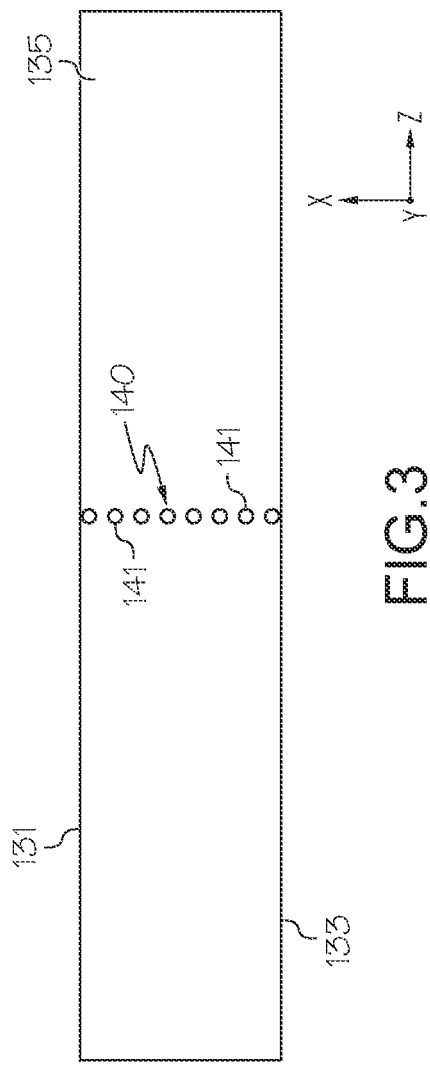

METHODS OF FABRICATING GLASS ARTICLES BY LASER DAMAGE AND ETCHING

CROSS REFERENCE TO RELATED APPLICATIONS

This application claims priority to U.S. Provisional Patent Application No. 61/731,013, filed Nov. 29, 2012. The entirety of this provisional application is incorporated herein by reference.

BACKGROUND

1. Field

The present specification generally relates to methods of fabricating glass articles and, more particularly, methods of fabricating glass articles by creating laser damage regions and preferentially etching the laser damage regions.

2. Technical Background

Glass articles are used in a variety of industries, including the electronics industry where glass is used to cover displays devices. Examples of such display devices include Liquid Crystal Displays and Light Emitting Diode displays, for example, computer monitors, televisions, and handheld devices. Three-dimensional glass articles are increasingly being used for their aesthetically pleasing appearance and tactile feel. However, meeting low dimensional tolerances, particularly with shaped glass, is challenging because the glass has dimensional deformation during reforming, annealing, and chemical strengthening. Additionally, traditional computer numerical control ("CNC") machining methods used to create through-features such as holes, if performed prior to reforming, will cause non-uniform heating during glass reforming that may lead to waviness of the surface of the glass article and undesired deformation.

SUMMARY

According to various embodiments, a method of forming a glass article is disclosed. The method includes providing a glass substrate sheet, translating a pulsed laser beam on the glass substrate sheet to form a laser damage region extending from a first surface of the glass substrate sheet to a second surface of the glass substrate sheet, applying the glass substrate sheet with an etchant solution comprising about 1M to about 3M of hydrofluoric acid and hydrochloric acid, strengthening the glass substrate sheet by an ion-exchange strengthening process, and coating the glass substrate sheet with an acid-resistant coating. The pulsed laser beam has a wavelength in the ultraviolet spectrum and a power of about 0.1 W to about 2.0 W. The laser damage region may include a plurality of defect lines. A concentration of the hydrochloric acid is less than about 1M if a concentration of the hydrofluoric acid is greater than about 2M, and the concentration of the hydrochloric acid is between about 1M and about 3M if the concentration of the hydrofluoric acid is less than about 2M.

In some embodiments, the glass substrate sheet is reformed by preheating the glass substrate sheet to a preheated temperature, and then heating the local area of the glass substrate sheet to a localized temperature that is greater than the preheated temperature, thereby bending the glass substrate sheet at the local area. The preheated temperature and the localized temperature are lower than a softening point of the glass substrate sheet.

The pulsed laser beam is operated such that an energy applied to the glass substrate sheet is at or above a damage threshold of the glass substrate sheet. In some embodiments, the pulsed laser beam has a wavelength that is in the ultraviolet spectrum, and a power of the pulsed laser beam is between about 0.1 W and about 2.0 W. In some embodiments, the laser damage region does not contact an edge of the glass substrate sheet.

In some embodiments, the pulsed laser beam is translated on the glass substrate sheet at multiple passes, and a focus of the pulsed laser beam is modified at each pass such that the laser damage region is defined by a plurality of laser damage lines extending from the first surface to the second surface within a bulk of the glass substrate sheet. Adjacent laser damage lines of the plurality of laser damage lines may be offset with respect to one another. In some embodiments, a position of the pulsed laser beam with respect to the glass substrate sheet is adjusted at each pass such that the plurality of laser damage lines define a curve within a bulk of the glass substrate sheet from the first surface of the glass substrate sheet to the second surface of the glass substrate sheet.

In some embodiments, applying the etchant solution to the glass substrate sheet includes spraying the glass substrate sheet with the etchant solution. In other embodiments, applying the etchant solution to the glass substrate sheet includes submerging the glass substrate sheet in the etchant solution. Ultrasonic agitation may be applied to the etchant solution in some embodiments. Spray nozzles for spraying the etchant may oscillate at speeds from about 0 oscillations per minute to about 40 oscillations per minute. The pressure from the spray nozzle may be from about 1.0 bar to about 1.25 bars.

In some embodiments, the etchant solution includes about 1M to about 3M of hydrofluoric acid and a mineral acid, wherein a concentration of the mineral acid is less than about 1M if a concentration of the hydrofluoric acid is greater than about 2M, and the concentration of the mineral acid is between about 1M and about 3M if the concentration of the hydrofluoric acid is less than about 2M. The mineral acid may be hydrochloric acid, sulfuric acid, nitric acid, or combinations thereof, in some embodiments.

In some embodiments a temperature of the etchant solution is below about 30° C.

According to further embodiments, a method of forming a glass article includes providing a glass substrate sheet, and translating a pulsed laser beam on the glass substrate sheet to form a laser damage region extending from a first surface of the glass substrate sheet to a second surface of the glass substrate sheet, the laser damage region having an initial geometry. The pulsed laser beam has a wavelength in the ultraviolet spectrum and a power of about 0.1 W to about 2.0 W, and the laser damage region is defined by a plurality of defect lines. The method further includes preheating the glass substrate sheet to a preheated temperature, and heating a local area of the glass substrate sheet to a localized temperature that is greater than the preheated temperature, thereby bending the glass substrate sheet at the local area. At least a portion of the laser damage region is within the local area, and a geometry of the laser damage region changes from the initial geometry to a desired geometry following the heating of the local area to the localized temperature such that the initial geometry compensates for the bending of the glass substrate sheet. The method further includes submerging the glass substrate sheet in a bath of etchant solution to remove a portion of the glass substrate sheet about the laser damage region. The etchant solution includes about 1M to about 3M of hydrofluoric acid and a mineral acid. A concentration of the mineral acid is less than about 1M if a concentration of the hydrofluoric acid is greater than about 2M, and the concentration of the mineral acid is between about 1M and about 3M if the concentration of the hydrofluoric acid is less than about 2M. The method further includes agitating the bath of etchant solution at an ultrasonic agitation frequency until a portion of the glass substrate sheet is substantially removed, thereby forming the glass article. The ultrasonic agitation frequency is about 40 kHz and a temperature of the bath of etchant solution is below about 20° C. in some embodiments.

According to yet further embodiments, a method of forming a glass article includes providing a glass substrate sheet, and translating a pulsed laser beam on the glass substrate sheet to form a laser damage region extending from a first surface of the glass substrate sheet to a second surface of the glass substrate sheet. The pulsed laser beam has a wavelength in the ultraviolet spectrum and a power of about 0.5 W to about 2.0 W. The laser damage region is defined by a plurality to defect lines, and has an initial geometry. The method further includes submerging the glass substrate sheet in a bath of etchant solution of about 1M to about 3M of hydrofluoric acid and hydrochloric acid. A concentration of the hydrochloric acid is less than about 1M if a concentration of the hydrochloric acid is greater than about 2M, and the concentration of the hydrochloric acid is between about 1M and about 3M if the concentration of the hydrochloric acid is less than about 2M. A temperature of the bath of etchant solution is less than about 30° C. The method further includes agitating the bath of etchant solution at an ultrasonic agitation frequency of about 40 kHz until a portion of the glass substrate sheet about the laser damage region is substantially removed, thereby forming the glass article.

In some embodiments, the glass article may be a shaped glass article having a three dimensional shape. In such embodiments, the laser damage and etching process may be integral to forming the three-dimensional features of the shaped glass article. However, in other embodiments, the shaped glass article may be formed by any suitable method, such as molding, blow molding, etc., and the laser damage and etching process may be conducted after the three-dimensional features have been formed in the glass article. In yet further embodiments, the glass article may be a flat glass sheet.

It should be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 3 schematically depicts a side view of a laser damage region within a flat glass substrate sheet according to one or more embodiments described and illustrated herein;

DETAILED DESCRIPTION

Figure 1:
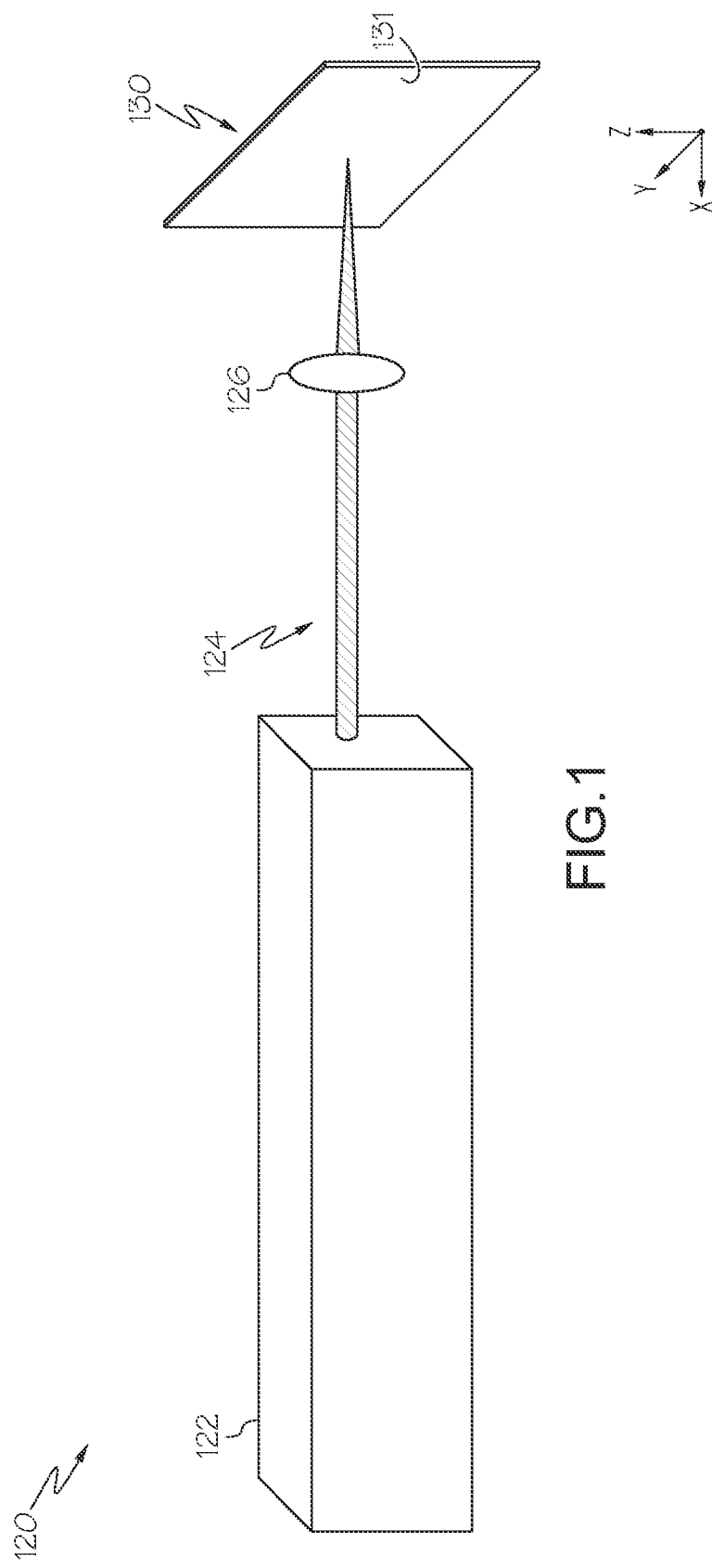
FIG. 1 schematically depicts a laser system for generating laser damage regions within a flat glass substrate sheet according to one or more embodiments described and illustrated herein.

Reference will now be made in detail to embodiments of methods of making glass articles from a flat glass substrate sheet using laser damage and chemical etching processes. Generally, laser damage regions are formed within a flat glass substrate sheet around the edges of one or more desired glass articles to be separated from the flat glass substrate sheet, as well as formed around through-features (e.g., slots, holes, and the like) of the one or more desired glass articles. The laser damage regions are preferentially etched when the glass substrate sheet is subjected to an etchant solution. Prior to etching the glass substrate sheet and after forming the laser damage regions, the flat glass substrate sheet may, in embodiments, be reformed to achieve the desired three-dimensional shape of the one or more glass articles. The laser damage regions are created with an initial geometry that precompensates for the changing shape of the flat glass substrate sheet during the reforming, etching, and/or strengthening processes such that laser damage regions have a desired geometry after the reforming, etching, and/or strengthening processes. The glass substrate sheet is then subjected to an etchant solution to separate the one or more glass articles, as well as create through-features within the one or more glass articles. In some embodiments, the separated glass articles may then be subjected to a strengthening process, such as an ion-exchange chemical strengthening process. The embodiments described herein may provide the capability of obtaining curvature on the very edge of the glass article when a bending process is used. Various methods of shaped glass articles from a flat glass substrate sheet will be described in more detail herein with specific reference to the appended drawings. Whenever possible, the same reference numerals will be used throughout the drawings to refer to the same or like parts.

The glass initially may be a flat glass substrate sheet formed of any glass composition. In some embodiments, the flat glass substrate sheet comprises an alkali aluminosilicate glass. In one embodiment, the alkali aluminosilicate glass comprises: from about 64 mol % to about 68 mol % $SiO_2$; from about 12 mol % to about 16 mol % $Na_2O$; from about 8 mol % to about 12 mol % $Al_2O_3$; from 0 mol % to about 3 mol % $B_2O_3$; from about 2 mol % to about 5 mol % $K_2O$; from about 4 mol % to about 6 mol % MgO; and from 0 mol % to about 5 mol % CaO; wherein: 66 mol % $\leq SiO_2+B_2O_3+CaO \leq 69$ mol %; $Na_2O+K_2O+B_2O_3+MgO+CaO+SrO>10$ mol %; 5 mol % $\leq MgO+CaO+SrO \leq 8$ mol %; $(Na_2O+B_2O_3)-Al_2O_3 \geq 2$ mol %; 2 mol % $\leq Na_2O-Al_2O_3 \leq 6$ mol %; and 4 mol % $\leq (Na_2O+K_2O)-Al_2O_3 \leq 10$ mol %.

In another embodiment, the alkali aluminosilicate glass comprises: from about 60 mol % to about 70 mol % $SiO_2$; from about 6 mol % to about 14 mol % $Al_2O_3$; from 0 mol % to about 15 mol % $B_2O_3$; from 0 mol % to about 15 mol % $Li_2O$; from 0 mol % to about 20 mol % $Na_2O$; from 0 mol % to about 10 mol % $K_2O$; from 0 mol % to about 8 mol % MgO; from 0 mol % to about 10 mol % CaO; from 0 mol % to about 5 mol % $ZrO_2$; from 0 mol % to about 1 mol % $SnO_2$; from 0 mol % to about 1 mol % $CeO_2$; less than about 50 ppm $As_2O_3$; and less than about 50 ppm $Sb_2O_3$; wherein 12 mol % $\leq Li_2O+Na_2O+K_2O \leq 20$ mol % and 0 mol % $\leq MgO+CaO \leq 10$ mol %.

In another embodiment, the alkali aluminosilicate glass comprises $SiO_2$ and $Na_2O$, wherein the glass has a temperature $T_{35kp}$ at which the glass has a viscosity of 35 kilo poise (kpoise), wherein the temperature $T_{breakdown}$ at which zircon breaks down to form $ZrO_2$ and $SiO_2$ is greater than $T_{35kp}$. In some embodiments, the alkali aluminosilicate glass comprises: from about 61 mol % to about 75 mol % $SiO_2$; from about 7 mol % to about 15 mol % $Al_2O_3$; from 0 mol % to about 12 mol % $B_2O_3$; from about 9 mol % to about 21 mol % $Na_2O$; from 0 mol % to about 4 mol % $K_2O$; from 0 mol % to about 7 mol % MgO; and 0 mol % to about 3 mol % CaO.

In another embodiment, the alkali aluminosilicate glass comprises at least 50 mol % $SiO_2$ and at least one modifier selected from the group consisting of alkali metal oxides, wherein $[(Al_2O_3 \text{ (mol \%)}+B_2O_3 \text{ (mol \%)})/(\Sigma \text{ alkali metal modifiers (mol \%)})]>1$. In some embodiments, the alkali aluminosilicate glass comprises: from 50 mol % to about 72 mol % $SiO_2$; from about 9 mol % to about 17 mol % $Al_2O_3$; from about 2 mol % to about 12 mol % $B_2O_3$; from about 8 mol % to about 16 mol % $Na_2O$; and from 0 mol % to about 4 mol % $K_2O$.

In another embodiment, the alkali aluminosilicate glass comprises $SiO_2$ and at least one modifier selected from the group consisting of alkaline metal oxides. In some embodiments, the alkaline metal oxide modifiers may be selected from the group consisting of MgO, CaO, SrO, BaO and mixtures thereof. Without being bound to any particular theory, it is believed that the alkaline earth metals are less soluble in the etchant (e.g., HF) than other modifiers and, thus, glasses containing alkaline earth metals have slow surface etch rates, which may lead to decreased waviness of a finished glass article. In some embodiments, the alkali aluminosilicate glass comprises from about 5 mol % to about 14 mol % alkaline metal oxides, such as from about 8 mol % to about 12 mol % alkaline earth metal oxides. In some embodiments, the alkali aluminosilicate glass comprises: from 50 mol % to about 72 mol % $SiO_2$; from about 9 mol % to about 17 mol % $Al_2O_3$; from about 2 mol % to about 12 mol % $B_2O_3$; from about 8 mol % to about 16 mol % $Na_2O$; from 0 mol % to about 4 mol % $K_2O$; and from about 5 mol % to about 14 mol % MgO+CaO+SrO.

In another embodiment, the alkali aluminosilicate glass comprises $SiO_2$, $Al_2O_3$, $P_2O_5$, and at least one alkali metal oxide ($R_2O$), wherein $0.75 \leq [(P_2O_5(\text{mol \%})+R_2O(\text{mol \%}))/M_2O_3 \text{ (mol \%)}] \leq 1.2$, where $M_2O_3=Al_2O_3+B_2O_3$. In some embodiments, the alkali aluminosilicate glass comprises: from about 40 mol % to about 70 mol % $SiO_2$; from 0 mol % to about 28 mol % $B_2O_3$; from 0 mol % to about 28 mol % $Al_2O_3$; from about 1 mol % to about 14 mol % $P_2O_5$; and from about 12 mol % to about 16 mol % $R_2O$; and, in certain embodiments, from about 40 to about 64 mol % $SiO_2$; from 0 mol % to about 8 mol % $B_2O_3$; from 16 mol % to about 28 mol % $Al_2O_3$; from about 2 mol % to about 12% $P_2O_5$; and from about 12 mol % to about 16 mol % $R_2O$.

In still other embodiments, the alkali aluminosilicate glass comprises at least about 4 mol % $P_2O_5$, wherein ($M_2O_3$ (mol %)/$R_xO$ (mol %))<1, wherein $M_2O_3=Al_2O_3+B_2O_3$, and wherein $R_xO$ is the sum of monovalent and divalent cation oxides present in the alkali aluminosilicate glass. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO. In some embodiments, the glass comprises 0 mol % $B_2O_3$.

In still another embodiment, the alkali aluminosilicate glass comprises at least about 50 mol % $SiO_2$ and at least about 11 mol % $Na_2O$, and the compressive stress is at least about 900 MPa. In some embodiments, the glass further comprises $Al_2O_3$ and at least one of $B_2O_3$, $K_2O$, MgO and ZnO, wherein $-340+27.1 \cdot Al_2O_3-28.7 \cdot B_2O_3+15.6 \cdot Na_2O-61.4 \cdot K_2O+8.1 \cdot (MgO+ZnO) \geq 0$ mol %. In particular embodiments, the glass comprises: from about 7 mol % to about 26 mol % $Al_2O_3$; from 0 mol % to about 9 mol % $B_2O_3$; from about 11 mol % to about 25 mol % $Na_2O$; from 0 mol % to about 2.5 mol % $K_2O$; from 0 mol % to about 8.5 mol % MgO; and from 0 mol % to about 1.5 mol % CaO.

In some embodiments, the alkali aluminosilicate glasses described hereinabove are substantially free of (i.e., contain 0 mol % of) at least one of lithium, boron, barium, strontium, bismuth, antimony, and arsenic.

In some embodiments, the alkali aluminosilicate glasses described hereinabove are down-drawable by processes known in the art, such as slot-drawing, fusion drawing, re-drawing, and the like, and has a liquidus viscosity of at least 130 kilopoise.

Referring initially to FIG. 1, a system 120 for inducing the laser damage regions into a flat glass substrate sheet 130 is schematically depicted. A laser source 122 is provided that is operable to generate a pulsed laser beam 124 that is focused by coupling optics 126 and directed toward the flat glass substrate sheet 130. The laser source 122 may be any laser source capable of inducing the laser damage regions. As an example and not a limitation, the laser source 122 generates a pulsed ultraviolet ("UV") pulsed laser beam 124 (e.g., about 355 nm in wavelength) that is operated in picosecond or nanosecond pulses. In some embodiments, laser damage may be induced into regions of the flat glass substrate The coupling optics 126 may be configured as one or more lenses that focus the pulsed laser beam 124 into a focused laser beam having a focal point at a desired location with respect to the flat glass substrate sheet 130. As described in more detail below, in some embodiments, the focus of the coupling optics 126 may be controllable to form a laser damage region within the flat glass substrate sheet 130 by a trepanning process such that the focal point is varied, and a laser damage region is formed through a bulk of the flat glass substrate sheet 130.

The pulsed laser beam 124 may be configured to be scanned on the flat glass substrate sheet 130 to form the desired laser damage region. In some embodiments, the flat glass substrate sheet 130 may be coupled to a computer-controlled XYZ stage (not shown) such that the flat glass substrate sheet is translated with respect to the pulsed laser beam 124. Additionally, a beam splitter (not shown) may also be provided to split a single laser beam 124 generated by the laser source 122 into a plurality of laser beams for simultaneously forming a plurality of laser damage regions within the flat glass substrate sheet 130.

Figure 2:
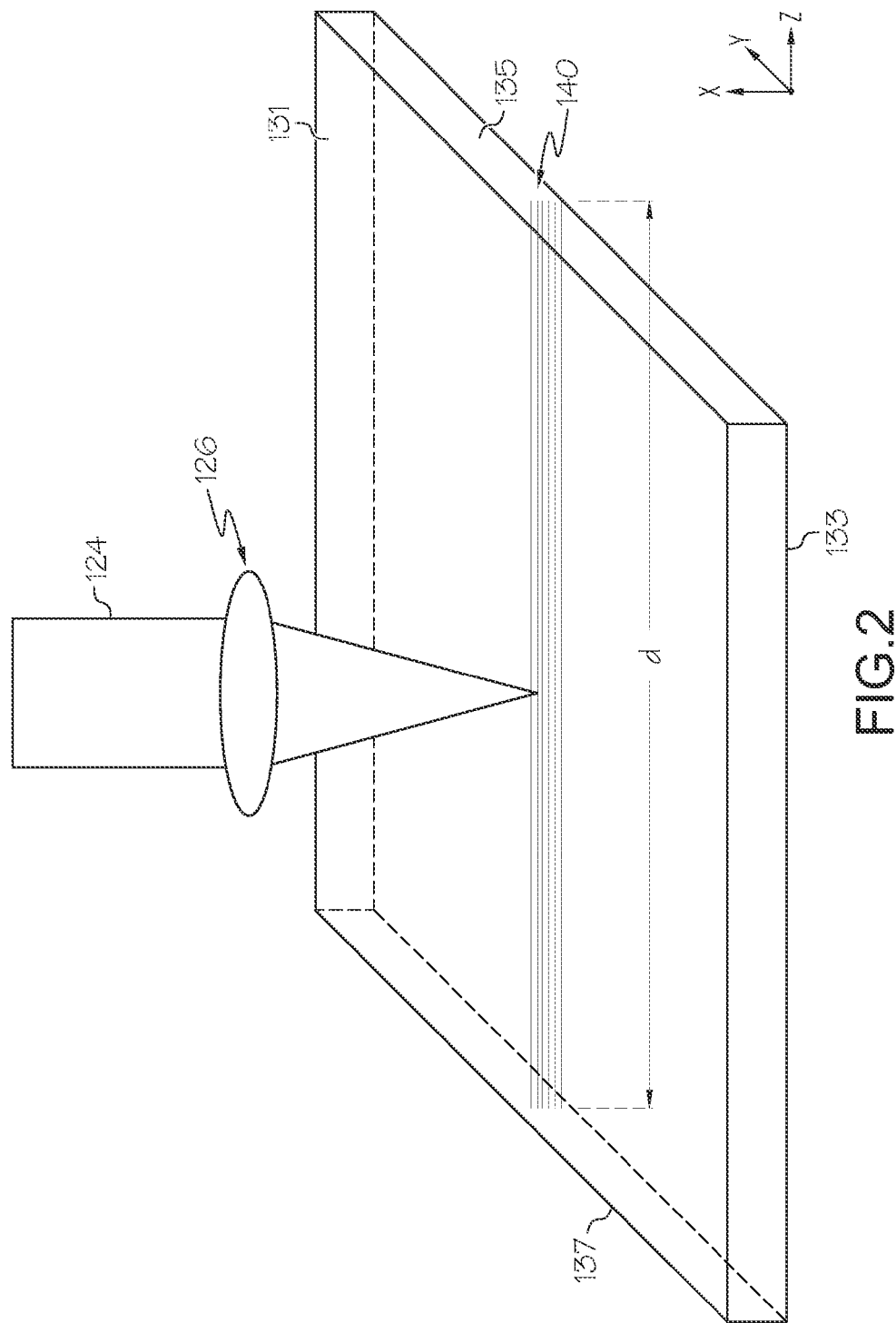
FIG. 2 schematically depicts a top perspective view of a flat glass substrate sheet and a focused, pulsed laser beam according to one or more embodiments described and illustrated herein.

Referring now to FIGS. 2 and 3, a straight laser damage region 140 within a flat glass substrate sheet is depicted. FIG. 2 depicts a perspective view of the flat glass substrate sheet 130 and a pulsed laser beam 124 being focused by coupling optics 126, while FIG. 3 depicts a side view of the flat glass substrate sheet 130. The laser damage region 140 is defined by a plurality of individual laser damage lines 141 that are located at and between a first surface 131 and a second surface 133 at different depths within a bulk of the flat glass substrate sheet 130. As shown in FIGS. 2 and 3, the individual laser damage lines 141 are vertically arranged on the x-axis. Each individual laser damage line 141 may be formed by one or more passes of the pulsed laser beam 124. For example, the first laser damage line 141 may be formed by setting the focal point of the pulsed laser beam 124 at, or just above, the second surface 133 (i.e., the underside surface) and near a first edge 135 of the flat glass substrate sheet 130, and translating the pulsed laser beam 124 (and/or the flat glass substrate sheet 130) over the flat glass substrate sheet 130 at a distance d toward a second edge 137. Then, the position of the focal point of the pulsed laser beam 124 is incrementally moved toward the first surface 131 of the flat glass substrate sheet 130, either by controlling the coupling optics 126, or by moving the flat glass substrate sheet 130. The pulsed laser beam 124 is then translated over the glass substrate sheet again either from the second edge 137 toward the first edge 135, or from the first edge 135 toward the second edge 137). The process may be repeated until pulsed laser beam 124 traverses at, or just below, first surface 131 (i.e., the upper surface), thereby completing the formation of the laser damage region 140. Microcracks formed by the individual laser damage lines 141 may extend to adjacent individual laser damage lines 141, thereby forming a microcrack network.

To prevent uncontrollable splitting of the flat glass substrate sheet 130 during the laser irradiation process, in some embodiments the individual laser damage lines 141 do not contact the edges (e.g., the first and second edges 135, 137). For example, the ends of the individual damage lines 141 may be offset from the edges of the flat glass substrate sheet 130 by a few millimeters. Further, the pulsed laser beam 124 should be operated such that it does not form grooves within the first and second surfaces 131, 133 of the flat glass substrate sheet 130. The pitch between the individual laser damage lines 141 may be set such that the flat glass substrate sheet 130 does not prematurely crack along the laser damage region 140. In some embodiments, the pitch between the individual laser damage lines 141 may be less than or equal to about 5.0 µm.

Figure 4A:
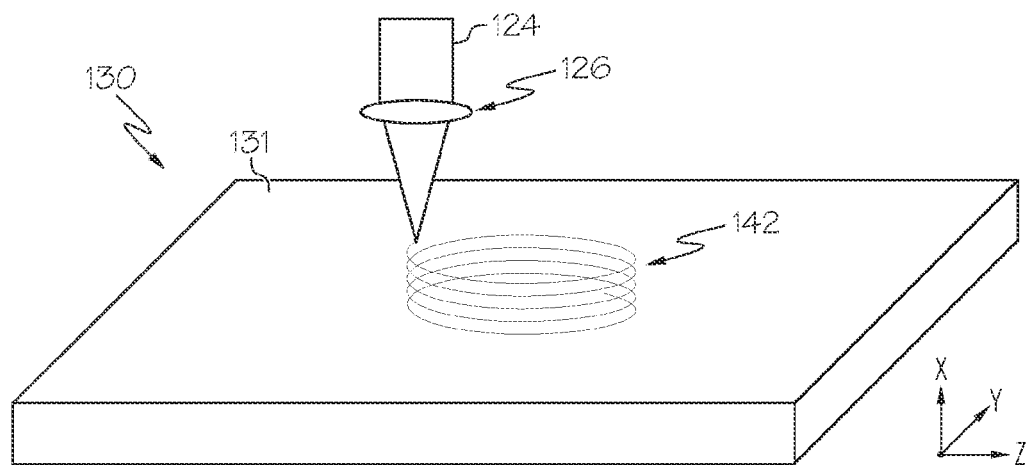
FIG. 4A schematically depicts a top perspective view of a flat glass substrate sheet having a helical laser damage line according to one or more embodiments described and illustrated herein.
Figure 4B:
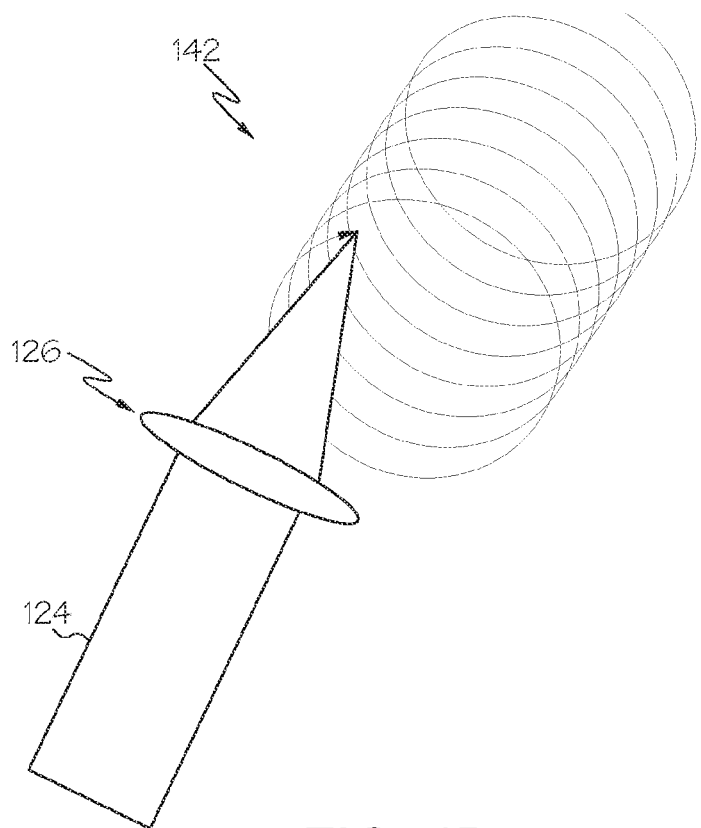
FIG. 4B schematically depicts a focused, pulsed laser beam forming a helical laser damage line according to one or more embodiments described and illustrated herein.

In some embodiments, the laser damage region may be formed via trepanning by use of a helical laser damage line. Referring now to FIGS. 4A and 4B, a helical laser damage line 142 to create a circular through-feature within the flat glass substrate sheet is illustrated. FIG. 4A depicts a helical laser damage line 142 within a flat glass substrate sheet 130, while FIG. 4B depicts a helical laser damage line 142 without the flat glass substrate sheet 130. The focal point of the pulsed laser beam 124 is set at, or just above, the second surface 133 (i.e., the underside surface) of the flat glass substrate sheet 130. The pulsed laser beam 124 (or the flat glass substrate sheet 130) is translated on the y- and z-axes according to the desired shape of the through-feature (or edge of the desired glass article). Simultaneously, the focal point of the pulsed laser beam 124 is continuously or discretely adjusted toward the first surface 131 (i.e., the upper surface), thereby forming a helical laser damage line 142. When the flat glass substrate sheet 130 etched during the etching process, the etchant solution preferentially etches the laser damage region defined by the helical laser damage line 142.

Figure 5:
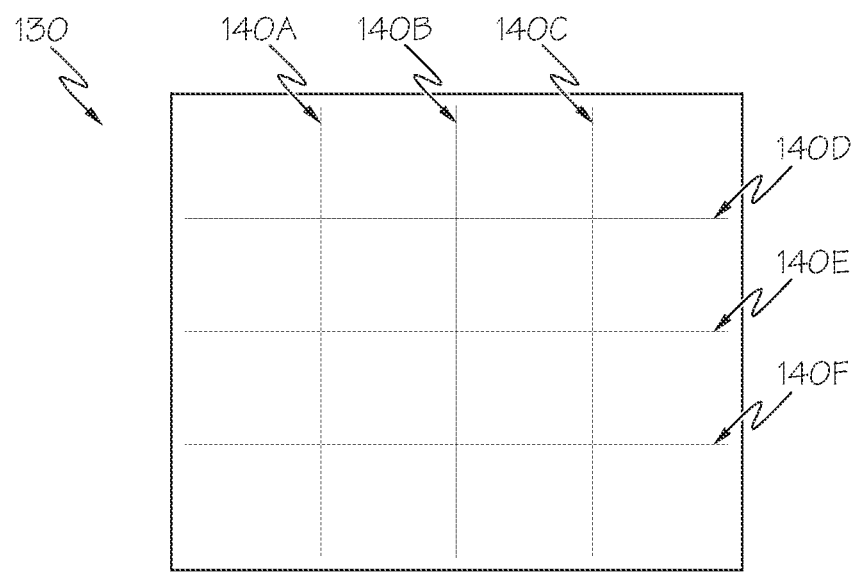
FIG. 5 schematically depicts a top view of a flat glass substrate sheet having a plurality of intersecting laser damage regions according to one or more embodiments described and illustrated herein.

FIG. 5 depicts a top view of a flat glass substrate sheet 130 having a plurality of intersecting laser damage lines 140A-140F to separate a plurality of glass articles. As shown in FIG. 5, vertical laser damage lines 140A-140C intersect horizontal laser damage lines 140D-140F. After the reforming process, the laser damage lines 140A-140F may be etched during the etching process to separate the flat glass substrate sheet 130 into a plurality of glass articles, such as glass sheets or shaped glass articles.

Figure 6A:
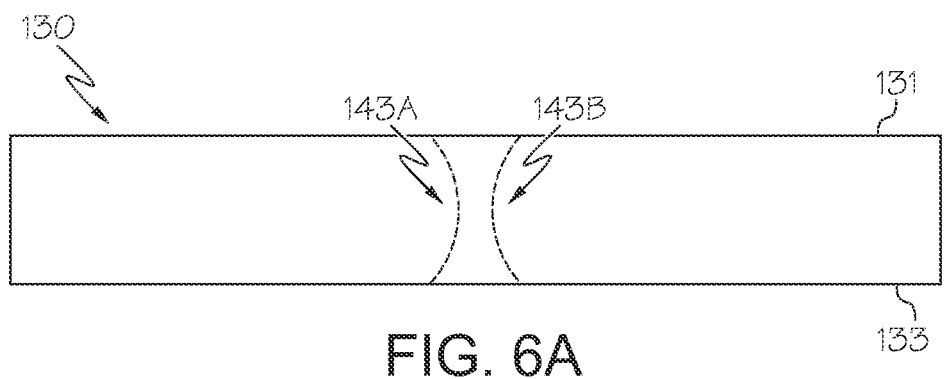
FIG. 6A schematically depicts a side view of a flat glass substrate sheet having a laser damage region defined by two adjacent, curved laser damage lines according to one or more embodiments described and illustrated herein.
Figure 6B:
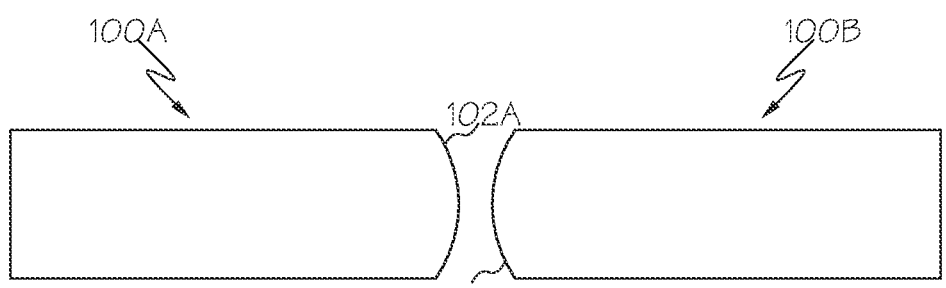
FIG. 6B schematically depicts two glass articles with curved edges separated at the two curved damage lines as depicted in FIG. 6A.

The laser damage lines may also be shaped through the bulk of the glass substrate sheet to provide for shaped edges of the separated glass articles. Referring now to FIG. 6A, a flat glass substrate sheet 130 is schematically depicted having two adjacent, offset laser damage regions 143A, 143B. The adjacent laser damage regions 143A, 143B have an opposing curve from the first surface 131 to the second surface 133 of the flat glass substrate sheet 130. The focal point of the pulsed laser beam 124 may be adjusted at each pass through the flat glass substrate sheet 130 to define the curve of the adjacent, offset laser damage regions 143A, 143B. FIG. 6B schematically depicts the flat glass substrate sheet 130 separated into two glass articles 100A, 100B following an etching process. The curved laser damage regions 143A, 143B have yielded a rounded edge 102A, 102B for the two glass articles 100A, 100B, respectively. The curved laser damage regions 143A, 143B may have shapes other than those depicted in FIG. 6A to produce chamfered edges, bullnosed edges, and the like.

In embodiments, the laser source may be operated at a repetition rate ranging from about 60 kHz to about 200 kHz. The output power of the laser source and the focusing conditions of the coupling optics should be such that the energy fluence and intensity in the beam focus are at or slightly above damage threshold of the flat glass substrate sheet. In embodiments, the output power of the laser source may be from about 0.1 W to about 2.0 W, such as from about 0.5 W to about 2.0 W. In some embodiments, the output power of the laser source may be from about 0.75 W to about 1.5 W.

Selective etching of the laser damage areas may be performed with glass substrates having any glass thickness. It may be particularly advantageous for thinner glass substrates (e.g., below 0.3 mm) of which computer numerical control ("CNC") and other mechanical processes have very low yields.

Embodiments of the present disclosure separate glass articles and/or create through-features by subjecting the laser-written shaped glass substrate sheet to an etching process. Etchant solution may be provided by a spray method wherein the etchant solution is sprayed onto the shaped glass substrate sheet, or by submerging the shaped glass substrate sheet into a bath of etchant solution.

In some embodiments that use spraying to apply an etching solution to a glass article, the glass article may be inserted into a chamber configured with nozzles to spray two surfaces of the glass article. For example, where the glass article is a glass sheet, the chamber may comprise one set of nozzles positioned to spray etching solution on a first surface of the glass sheet, and the chamber may comprise a second set of nozzles positioned to spray etching solution on a second surface of the glass sheet opposite the first surface of the glass sheet in a thickness direction, for example. The oscillations of the spray ejected from the first set of nozzles may be higher than the oscillations of the spray ejected from the second set of nozzles so that when the portion of glass is removed from the glass article to create a through hole in the glass article, the portion of the glass article is ejected toward the second set of nozzles. By directing the ejection of the portion of the glass article to create a through hole away from the glass article, damage to the glass article may be minimized. For example, if the portion of the glass article were ejected from the glass article in an upward direction, the portion of the glass article may fall a surface of the glass article, thereby causing damage. Accordingly, the portion of the glass article may be ejected away from the glass article in embodiments to avoid damaging the glass article.

In embodiments where the etchant is applied by spraying, spray nozzles may oscillate at speeds from about 0 oscillations per minute to about 40 oscillations per minute, such as from about 10 oscillations per minute to about 30 oscillations per minute. In other embodiments, the nozzles may oscillate at speeds from about 15 oscillations per minute to about 25 oscillations per minute. The pressure of the spray from the nozzles may be from about 0.5 bar to about 1.7 bar, such as from about 0.75 bar to about 1.5 bar. In some embodiments, the pressure of the spray from the spray nozzles may be from about 1.0 bar to about 1.25 bar. The oscillations and pressure of the spray from the spray nozzle may be used to ensure that clean through holes are formed in a glass article. For example, if the oscillations are too slow and/or the pressure of the spray from the nozzles is too low, the etchant may pool and cause imprecise through holes, or the etchant may not completely separate the through hole from the glass substrate. However, when the oscillations are too fast and/or the pressure of the spray from the nozzle is too high, the glass substrate may be etched too quickly causing lumps and imperfections to be formed on the glass surface.

In embodiments, the etchant solution etches the laser damage regions because of the presence of microcracks within these laser damage regions. Both the laser damage regions and the non-damaged regions are etched simultaneously, but at different etch rates. The microcracks of the laser damage regions break chemical bonds, and provide pathways for etchant to penetrate deeper into the glass substrate sheet. Therefore, the etch rate at the laser damage regions is much faster than then non-damaged regions. Accordingly, the glass article may be cut or otherwise removed from the remaining portion of the glass substrate sheet when the etchant solution fully etches the laser damage regions. Further, through-features, such as holes and slots, may also be fabricated in this manner.

The etchant solution may comprise hydrofluoric acid as a primary etchant. Mineral acids, such as hydrochloric acid, sulfuric acid, and nitric acid, can assist the etch process and accelerate the etch rate, as well as improve the surface quality of the glass article and reduce the formation of sludge. It was found during experimentation that, when the concentration of hydrofluoric acid is high (e.g., 3M or greater), the etch time and quality of glass is not affected by the type of mineral acid. However, when the hydrofluoric acid concentration is low (e.g., 1M or less), hydrochloric acid requires the least etch time and yields the most desirable etch ratio of the three mineral acids. Therefore, hydrochloric acid may be preferred for most applications. Generally, at high concentrations of hydrofluoric acid (e.g., 3M or greater), the concentration of mineral acid should be low. When using hydrochloric acid, the concentration should be below 0.5M. At low concentrations of hydrofluoric acid (e.g., 1M or less), the concentration of mineral acid should be between about 1M and about 3M. In one embodiment, the concentration of hydrofluoric acid is about 2M, and the concentration of hydrochloric acid is about 0.5M.

Further, a surfactant is believed to be beneficial to the etch process because it can improve transportation of the etchant to the laser damage regions, and to suspend the byproduct produced by the etchant process. As a non-limiting example, the surfactant may be DuPont FS-10. It should be understood that other surfactants may be utilized. In embodiments, the surfactant may be present in amounts less than about 0.1 wt %, such as 0.01 wt %.

Agitation of the etchant solution bath improves the etch rate of the laser damage region because both etchant and the byproduct need to be constantly exchanged through the narrow channels of the microcracks within the laser damage regions. Agitation may accelerate the mass transfer inside the microcracks, and refresh that laser damage region surface for a continuous etching. Ultrasonic agitation influences the etch time, surface loss, and etch ratio. An effective agitation can increase the etch ratio between the laser damage regions and the non-damaged regions, which, in turn, may reduce the surface loss of the glass substrate sheet and reduce the cost of raw material. In some embodiments, the agitation is at a frequency below about 132 kHz. Because the reduction of ultrasound frequency increases the power of each individual impulsion and the scrubbing effect, lower frequencies and higher amplitudes favor the fast exchange of etchant and byproduct, and improve the etch rate at the laser damage regions. In one embodiment, the ultrasonic agitation frequency is about 40 kHz.

Spray etching is another form of agitation that may be used in embodiments to improve the etch rate of the laser damage region. The etch rate is driven by spray pressure, temperature of the etchant solution, and concentration of the etchant solution. Spray etching has shown better surface uniformity and quality of the glass article, but ultrasonic etching shows a higher differential etching between the bulk glass surface and the laser damage region.

It has been found that vertical movement of the bath in combination with ultrasonic agitation does not improve the etch rate of the laser damage regions because typically the cylindrical crack network of the laser damage regions is perpendicular to the vertical movement of the bath. In the direction parallel to the cracks, the velocity of the vertical movement is near zero. As a result, the etch ratio and the final thickness of the glass substrate sheet may be much lower when vertical agitation is applied together with ultrasound agitation.

Temperature of the etchant solution may also impact the etch rate and quality of the glass substrate sheet during the etching process. Generally, a low temperature etchant solution (e.g., between about 3° C. and about 10° C.) provides for reduced surface losses and a flat glass surface. However, the etch rate is sacrificed at lower temperatures. In one example, 0.7 mm Corning 2317 glass samples were laser damaged using the process described above and placed in a bath of an etchant solution of 2M hydrofluoric acid, 0.5M hydrochloric acid, and 0.1% surfactant. The bath was agitated at a 40 KHz ultrasound. At low temperatures of 3° C. to 10° C., the etch time was within a range of 12-15 minutes with a surface loss within a range of 24 μm-30 μm. At a temperature of 40° C., the etch time was about 6.5 minutes and the surface loss was between 50 μm-60 μm. Therefore, the temperature of the etchant solution should be kept low in applications where surface loss is an important parameter.

Higher etching solution temperatures generally increase the etch rate and, thus, higher etching solution temperatures may be used to decrease the duration of the etching process. However, when the temperature of the etching solution is too high during a spray etching process, the acid may evaporate out of the etching solution during the spraying. Accordingly, in embodiments, the temperature of the etching solution may be less than or equal to about 30° C., such as less than or equal to about 25° C. However, it should be understood that higher or lower temperatures may be used.

Another way to reduce surface losses of the glass substrate by the etchant is to apply a coating that is resistant to the etching solution, such as pure HF or a mixture of HF and mineral acids, to one or more surface of the glass substrate. In some embodiments, the acid-resistant coating is chosen so that the laser passes through the acid-resistant coating and creates laser damage in the underlying glass substrate.

According to some embodiments, the acid-resistant coating may comprise ethylene acrylic acid and wax polymer emulsions dispersed in water. In some embodiments, the acid-resistant coating composition has from about 5 wt % to about 60 wt % solids/polymers, such as from about 15 wt % to about 46 wt % solids/polymers. The type and amount of wax polymer and ethylene acrylic acid may be modified according to the desired application. The acid-resistant coating may be applied to the glass substrate by any suitable method. In some embodiments, the acid-resistant coating may be applied to the glass substrate by dip coating, spray coating, spin coating, or slot coating. Once the acid-resistant coating has been applied to the glass substrate, the acid-resistant coating may dried by heating. In some embodiments, the acid-resistant coating on the glass substrate may be dried by heating the acid-resistant coating to temperatures of from about 150° C. to about 190° C., such as about 170° C. In some embodiments, the duration of the drying step may be from about 10 minutes to about 40 minutes, such as from about 15 minutes to about 30 minutes. In other embodiments, the duration of the drying step may be about 20 minutes. Without being bound to any particular theory, it is believed that the heating in the drying step causes the wax polymer in the acid-resistant coating to bloom thereby providing a hydrophobic surface.

The thickness of the acid-resistant coating may be from about 1 μm to about 15 μm, such as from about 3 μm to about 8 μm. The acid-resistant coating may be removed by a solution of 3 wt % Semi-Klean with ultrasonics. Thin layers of the acid-resistant coating, such as less than about 10 μm, may be removed in boiling water.

As discussed above, in embodiments, the acid-resistant coating may be selected to allow the laser to pass through the acid-resistant coating and induce damage on the underlying glass substrate. Thus, in embodiments, the acid-resistant coating may be applied before or after laser damage is induced. In one embodiment, the coating may be applied to a glass substrate that has been strengthened, such as by ion exchange (which is discussed in detail below), and has a transparent conductive oxide coating, such as indium tin oxide. After the acid-resistant coating has been applied, laser damage may be induced to the underlying glass substrate as discussed in detail above. The glass substrate may then be etched and separated, and the acid-resistant coating may subsequently be removed. It should be understood that the acid-resistant coating may be applied at virtually any step in the process disclosed herein.

In further embodiments, a supplier may fabricate a glass substrate with holes and/or slots, and further processing may be conducted by a parts manufacturer. For example, in an embodiment, the supplier may provide a glass substrate sheet having a compression surface layer and tension in the center; an acid-resistant coating may be applied to the glass substrate sheet. Subsequent to coating the glass substrate sheet with an acid-resistant coating, the glass article may be irradiated with a laser to score the glass substrate sheet, form holes in the glass substrate sheet, or form slots in the glass substrate sheet. The glass substrate sheet may then be etched to open the holes and/or slots. The glass substrate sheet may then be shipped to a parts manufacturer. The parts manufacturer may then remove the acid-resistant coating and cleaned. A touch conductive oxide coating may then be deposited on the glass substrate sheet. The glass substrate sheet may be laser scored and broken into glass articles (however, in some embodiments, the glass supplier may score and break the glass substrate sheet). Subsequent to the breaking the glass substrate sheet into glass articles, the glass articles may be coated with an acid-resistant coating, and the edge may be etched for strengthening. Subsequent to the edge strengthening, the glass articles may undergo CNC finishing. The acid-resistant coating may then be removed, and the glass article may be washed and cleaned.

In some embodiments, the glass articles are strengthened by a strengthening process. In some embodiments, strengthening process may occur before the glass articles have been separated from the glass substrate. In other embodiments, the strengthening process may occur after the glass articles have been separated from the glass substrate. The glass articles may be chemically strengthened by an ion exchange process in which ions in the surface layer of the glass are replaced by larger ions having the same valence or oxidation state. In one particular embodiment, the ions in the surface layer and the larger ions are monovalent alkali metal cations, such as $Li^+$ (when present in the glass), $Na^+$, $K^+$, $Rb^+$, and $Cs^+$. Alternatively, monovalent cations in the surface layer may be replaced with monovalent cations other than alkali metal cations, such as $Ag^+$, $Tl^+$, $Cu^+$, or the like.

The ion-exchange process creates a compressive stress at the surfaces of the shaped glass article. These compressive stresses extend beneath the surface of the shaped glass article to a certain depth, referred to as the depth of layer. The compressive stresses are balanced by a layer of tensile stresses (referred to as central tension) such that the net stress in the shaped glass article is zero. The formation of compressive stresses at the surface of the shaped glass article makes the glass strong and resistant to mechanical damage and, as such, mitigates catastrophic failure of the shaped glass article for flaws which do not extend through the depth of layer.

In one embodiment, the shaped glass article is chemically strengthened by ion-exchange in which smaller sodium ions near the surface of the glass are exchanged with larger potassium ions when the glass article is placed in an ion exchange bath. Replacement of the smaller sodium ions with the larger potassium ions causes a layer of compressive stress to develop in the surfaces of the glass article. The compressive stress extends below the surfaces of the glass article to a specified depth of layer (compressive surface layer). A compressive surface layer extends from the upper surface and the underside surface to the depth of layer. The compressive surface layer is balanced by the development of the internal tension layer at the center of the glass article.

In the embodiments described herein, the compressive stress and depth of layer developed in the shaped glass article by strengthening are sufficient to improve the damage tolerance of the shaped glass article while also facilitating further processing (such as by edge finishing) without risk of introducing flaws into the shaped glass article. In one embodiment, the compressive stress may be from about 200 MPa to about 1000 MPa. In another embodiment, the compressive stress may be from about 500 MPa to about 800 MPa. In yet another embodiment, the compressive stress may be from about 650 MPa to about 900 MPa. In one embodiment, the depth of layer may be from about 10 microns to about 80 microns. In another embodiment, the depth of layer may be from about 30 microns to about 60 microns. In yet another embodiment, the depth of layer may be from about 40 microns to about 60 microns.

In embodiments, the etch process may be used as the strengthening process when other forms of chemical strengthening, such as ion exchange, is not compatible with the glass composition. Parts that have been differentially etched until the shaped glass part etched entirely through and has been removed from the substrate sheet can show very significant strength increase compared to CNC machined parts.

For example, in glass articles that cannot be strengthened by ion exchange because the glass is too thin, such as less than about 0.4 mm thick or even less than about 0.3 mm thick, or because the glass composition does not contain elements that are suitable for ion exchange, the etch process may be used to strengthen the glass article. Without being bound to any particular theory, it is believed that the etching process blunts the tips of surface defects and in some cases eliminates or reduces the depth of surface defects that can weaken the glass article. In embodiments, glasses formed by the laser damage and etching method disclosed above may have a failure rate of about 50% at forces of about 5 kg, or have a failure rate of less than about 20% at forces of about 4 kg.

Figure 7:
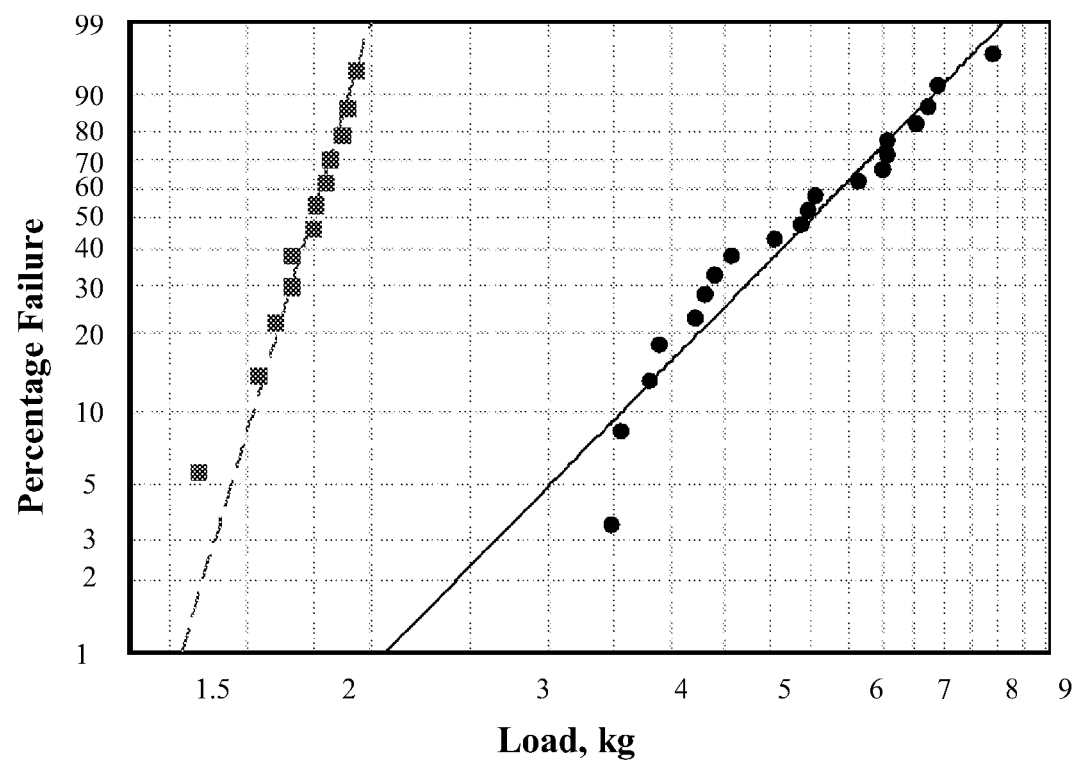
FIG. 7 is a scatter plot comparing the strength of glass articles formed by CNC only to the strength of glass articles formed by methods according to one or more embodiments described and illustrated herein.

FIG. 7 shows results from a ring-on-ring test for glasses produced by CNC only (represented by squares) and for glasses produced by laser damage and etching (represented by circles). The ring-on-ring test is conducted by placing a first ring having a first diameter on a first surface of the glass article. A second ring having a second diameter is place on a surface of the glass article opposite the first surface. The first ring has an inner diameter larger than an outer diameter of the second ring. Force is applied to the second ring at a relatively slow rate until the glass article fails, such as by cracking or shattering. As shown in FIG. 7, glass articles formed by CNC have a failure rate of 90% at forces around 2 kg. However, glass articles formed using the above-described laser damage and etching method have a failure rate, for example, of about 50% at forces of about 5 kg. The graph shown in FIG. 7 indicates that glass articles formed using a laser damage and etching method have more strength than glass articles formed by CNC methods alone.

In some embodiments, the glass substrate is strengthened after the laser damage and etching steps. However, in other embodiments the glass substrate may be strengthened before the laser damage and etching step.

In embodiments where the glass substrate is strengthened before the laser damage and etching steps, and with reference to FIG. 1, the laser source 122 may be operated at a repetition rate ranging from about 60 kHz to about 200 kHz. The output power of the laser source 122 and the focusing conditions of the coupling optics 126 should be such that the energy fluence and intensity in the beam focus are at or slightly above damage threshold of the flat glass substrate sheet. In embodiments, the output power of the laser source 122 may be less than or equal to about 0.6 W, such as from about 0.4 W to about 0.6 W. In some embodiments, the output power of the laser source 122 may be about 0.5 W. Without being bound to any particular theory, it is believed that edge roughness may be reduced to 1.5 µm to 2.0 µm by using laser sources having an output power at or below 0.6 W. In particular, edge roughness appears to be relatively constant in alkali aluminosilicate glasses at laser source output power from about 0.4 W to about 0.6 W.

In embodiments where the glass substrate is strengthened after the laser damage and etching steps, and with reference again to FIG. 1, the laser source 122 may be operated at a repetition rate ranging from about 5 kHz to about 40 kHz, such as about 10 kHz. In embodiments, the output power of the laser source 122 may be at or below 0.6 W, such as from about 0.1 W to about 0.4 W, such as from about 0.15 W to about 0.3 W depending on the thickness and compressive stress of the glass substrate. In some embodiments, the output power of the laser source 122 may be from about 0.2 W to about 0.25 W. Without being bound to any particular theory, it is believed that the laser creates multiple micro-cracks in the glass so that the glass volume increases in the laser damage region. This expansion may create laser-induced thermal effects that form additional compressive and tensile stresses superimposed in the existing stress pattern. This additional stress may be proportional to the laser power and may bring the glass closer to the frangibility limit. If the laser power is too low, it makes the laser damage too thin and it does not act as a cushion for high stresses in the surrounding glass. If the laser power is too high, it creates strong stresses that cannot be reduced by the laser damage. In both of these cases, the glass may break.

In either of the above embodiments (i.e., whether the glass substrate is strengthened before or after the laser damage and etching), the translation speed of the pulsed laser beam may be between about 50 mm/s and about 2 m/s, in some embodiments. In other embodiments, the translation speed of the pulsed laser may be from about 50 mm/s to about 300 mm/s, such as about 250 mm/s.

It should be understood that laser parameters other than those described above may be used to form the laser defect regions. Laser pulse energies may vary between 5 µJ and several hundred microjoules depending on parameters such as glass properties, translation speed, laser repetition rate, and the coupling optics 126, which may have the numerical aperture (NA) in between of 0.15 and 0.3 or more, for example.

Holes and/or shapes may be cut into flat glass sheets to form, for example, beveled or curved edges of the flat glass sheet, holes in the flat glass sheet required the design of the end product in which the glass is to be used (e.g., cellular phone, tablet computer, etc.).

Figure 8A:
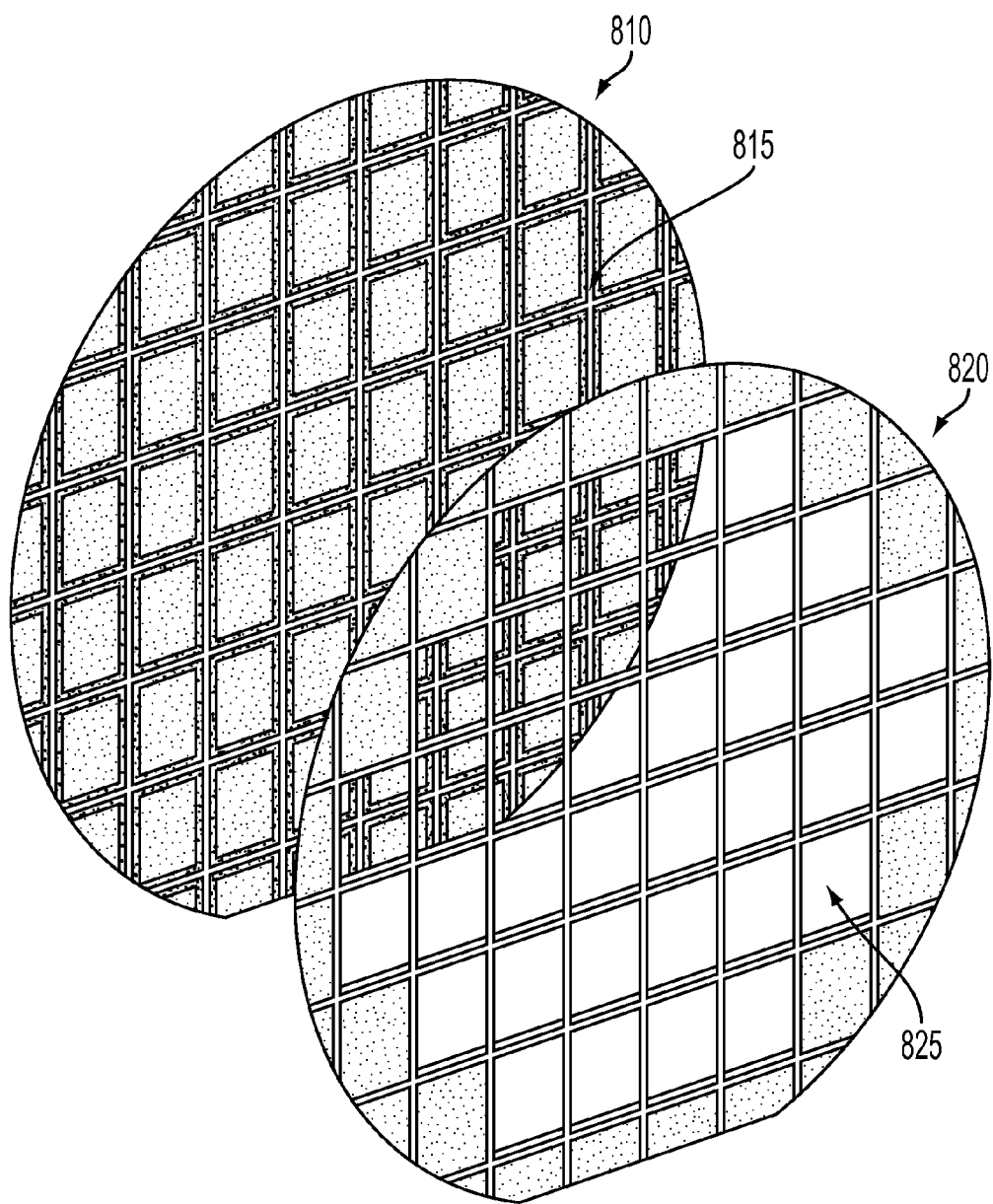
FIG. 8A schematically depicts a separate glass wafer and an interposer according to one or more embodiments described and illustrated herein.
Figure 8B:
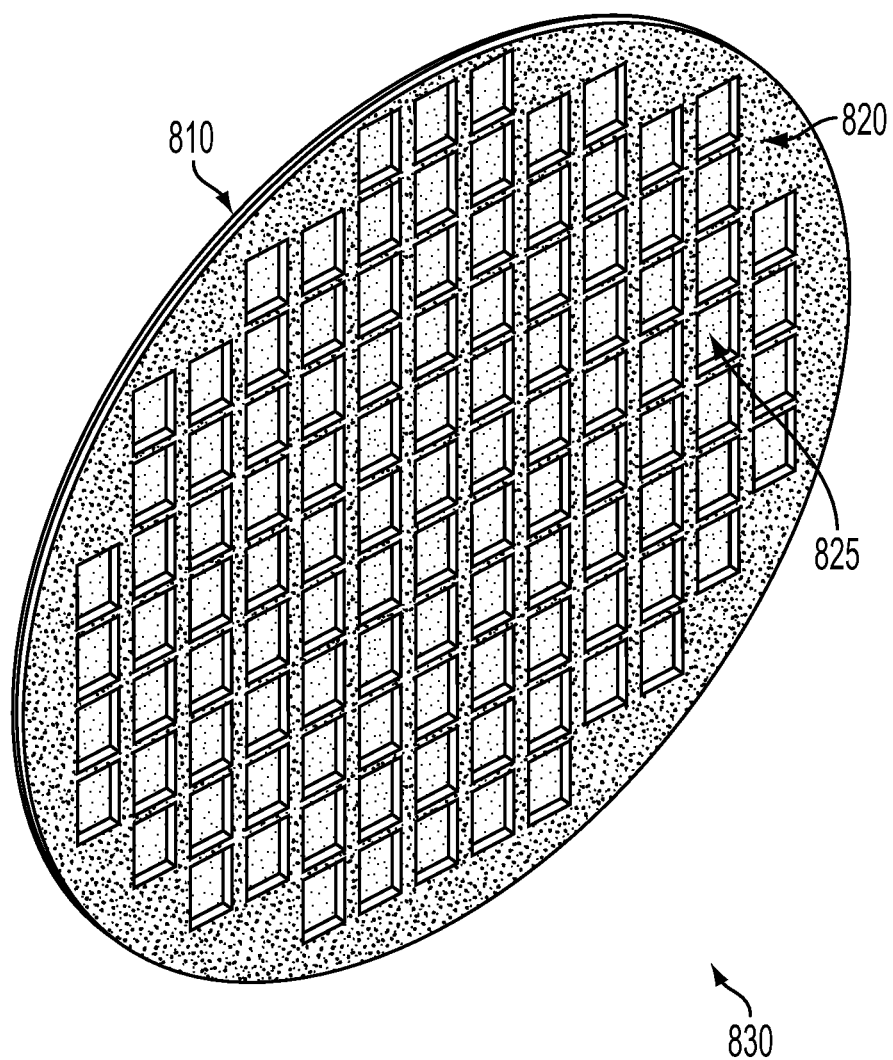
FIG. 8B schematically depicts a combined glass wafer and an interposer according to one or more embodiments described and illustrated herein.

In embodiments, the glass article may be formed as an interposer, such as for use in a digital light processing (DLP) device or other microelectromechanical system (MEMS). In such embodiments, and with reference to FIG. 8A, a glass wafer 810 may be formed by any suitable method and coated with an antireflective coating. It should be understood that although the glass wafer 810 depicted in FIG. 8A is circular, the glass wafer may have any shape. The antireflective coating is not particularly limited and, in embodiments, may be titanium nitride or niobium nitride, and may be applied by any suitable method, such as spray coating, dip coating, or manual application. The glass wafer 810 may also be patterned, for example, with a grid pattern 815, as shown in FIG. 8A. The grid pattern 815 may be formed from an adhesive, such as epoxy, urethane, and polyimides. To form a DLP or MEMS, an interposer 820 may be formed. As shown in FIG. 8A, the interposer 820 may have patterned through holes 825 formed by the above-described laser damage and etching method. The through holes 825 shown in FIG. 8A are rectangular and correspond to the grid pattern 815 formed on the glass wafer 810 so that the interposer 820 may be adhered to the glass wafer 810 by contacting the interposer 820 with the glass wafer 810, which may comprise an adhesive to form the DLP or MEMS holder 830 shown in FIG. 8B. DLP chips or other MEMS may be inserted into the through holes 825 in the interposer 820 to form a device that is suitable for use in an end product. In embodiments the interposer 820 is formed from glass that has not been strengthened, such as by an ion exchange treatment, and the etching process is used strengthen the interposer, as described above. In embodiments, glasses formed by the laser damage and etching method disclosed above may have a failure rate of about 50% at forces of about 5 kg, or have a failure rate of less than about 20% at forces of about 4 kg (see FIG. 7).

In some embodiments, the flat glass sheet comprising holes and/or shapes formed by the above-described laser damage etching process is used in the end product without further reshaping. However, in other embodiments, discussed in detail below, the laser damage and etching process is conducted on a flat glass substrate to precompensate for subsequent shaping of the flat glass substrate into a shaped glass article.

Figure 9:
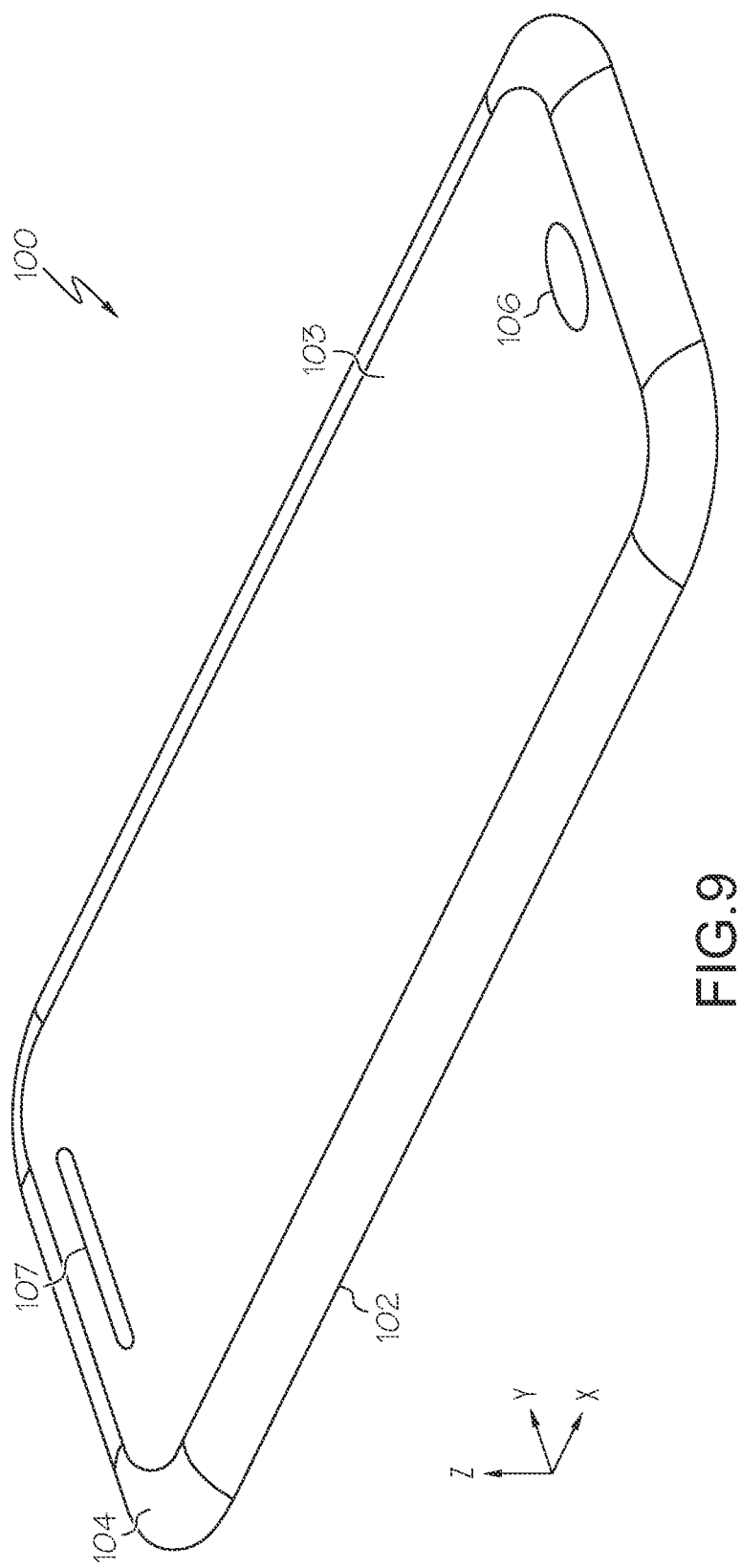
FIG. 9 schematically depicts a top perspective view of a shaped glass article according to one or more embodiments described and illustrated herein.

Referring now to FIG. 9, one non-limiting example of a shaped glass article 100 is schematically depicted. The shaped glass article 100 may be configured as a cover glass for a portable electronic device, for example. It should be understood that embodiments are not limited to the shaped glass articles depicted throughout the figures, and that the shaped glass articles may be used in any application, such as, without limitation, televisions, kitchen appliances, vehicles, and signs. The shaped glass article 100 depicted in FIG. 9 has a curved perimeter area 104 that curves downwardly in the z-axis direction from a flat portion 103, and terminates at an edge 102. Additionally, the shaped glass article 100 has a through-feature 106 that is configured as a hole, and a through-feature 107 configured as a slot. Fabrication of shaped glass articles such as the shaped glass article 100 depicted in FIG. 9 will now be described.

Figure 10:
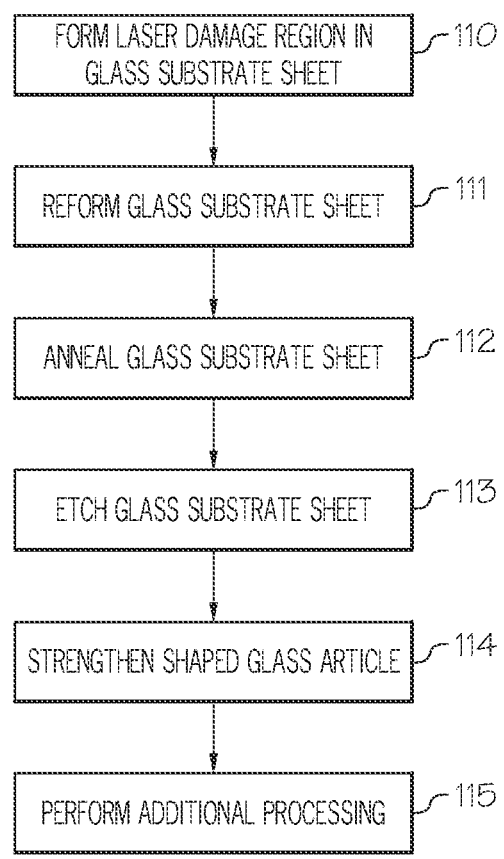
FIG. 10 is a flowchart describing a method of fabricating a shaped glass article according to one or more embodiments described and illustrated herein.

Referring now to FIG. 10, a flowchart of a process to fabricate shaped glass articles from a flat glass substrate sheet by laser damage and chemical etching processes. The flowchart of FIG. 10 will first be described generally, and then each process will be described in more detail. At block 110, a laser is utilized to induce laser damage regions in a flat glass substrate sheet. The laser damage regions extend from a first surface to a second surface of the glass substrate sheet, and are defined by laser-induced microcracks, spectroscopic defects, and the like. The laser damage regions are preferentially etched compared to the non-damaged regions during the etching process of block 113.

The laser damage regions have an initial geometry that precompensates for the deformation of the flat glass substrate sheet that occurs during the reforming process at block 111. Therefore, an initial geometry of a particular laser damage region may be different than a desired geometry of the edge or through-feature of the shaped glass article. A particular laser damage region intended to provide an edge of a glass article to be separated from the flat glass substrate sheet may have an initial geometry comprising a curve; however, following the reforming process, the laser damage region changes shape to be a straight line that represents a desired straight edge of the desired shaped glass article.

At block 111, the flat glass substrate sheet is reformed by a reforming process. The reforming process may be any process capable of three-dimensionally reforming the flat glass substrate sheet to define one or more shaped glass articles. Such reforming processes include, but are not limited to, press molding, gravity sagging, pressure forming, and localized heating and bending. In many applications, the reforming process creates a curved perimeter area of the shaped glass article. A curved perimeter area of a cover glass may be aesthetically pleasing to end-users, for example. As stated above, the initial geometry of the laser damage regions changes to a desired geometry as the glass is reformed into the desired shape. To remove internal stresses developed during the glass sheet fabrication process and/or the reforming process, the shaped glass substrate sheet may then be annealed by an annealing process at block 112. The annealing process may be any known or yet-to-be-developed annealing process.

At block 113, the reformed glass substrate sheet is subjected to an etchant solution to preferentially etch the laser damage regions, while minimally etching the non-damaged regions. The etching process separates the one or more shaped glass articles from the remaining reformed glass substrate sheet because the etchant solution etches the laser damage regions much more efficiently than the remaining non-damaged area of the reformed glass substrate sheet. Additionally, the middle portions of the through-features defined by one or more laser damage regions (e.g., a hole) drop out of the reformed glass substrate sheet when the laser damage regions are fully etched through. In some embodiments, hydrofluoric acid is the primary etchant of an etchant solution that also includes mineral acids, such as hydrochloric acid, sulfuric acid, and/or nitric acid. As described in more detail below, the etchant solution and etching process may be controlled to reduce the etch time, reduce surface waviness, reduce surface roughness, minimize sludge, and minimize thickness reduction.

Next, at block 114, the separated shaped glass articles may optionally be strengthened by a strengthening process. In some embodiments, the shaped glass articles may be strengthened by an ion-exchange chemical strengthening process. As described in more detail below, ions in a surface layer of the shaped glass articles are replaced by larger ions having the same valence or oxidation state, thereby forming a compressive surface layer on each surface of the shaped glass articles. The compressive surface layers may resist scratching and provide additional strength to the shaped glass articles.

At block 115, additional processing may be applied to the strengthened shaped glass articles, such as edge finishing, application of touch-sensitive layers (e.g., indium tin oxide layers), antireflective layers, and the like.

Figure 11:
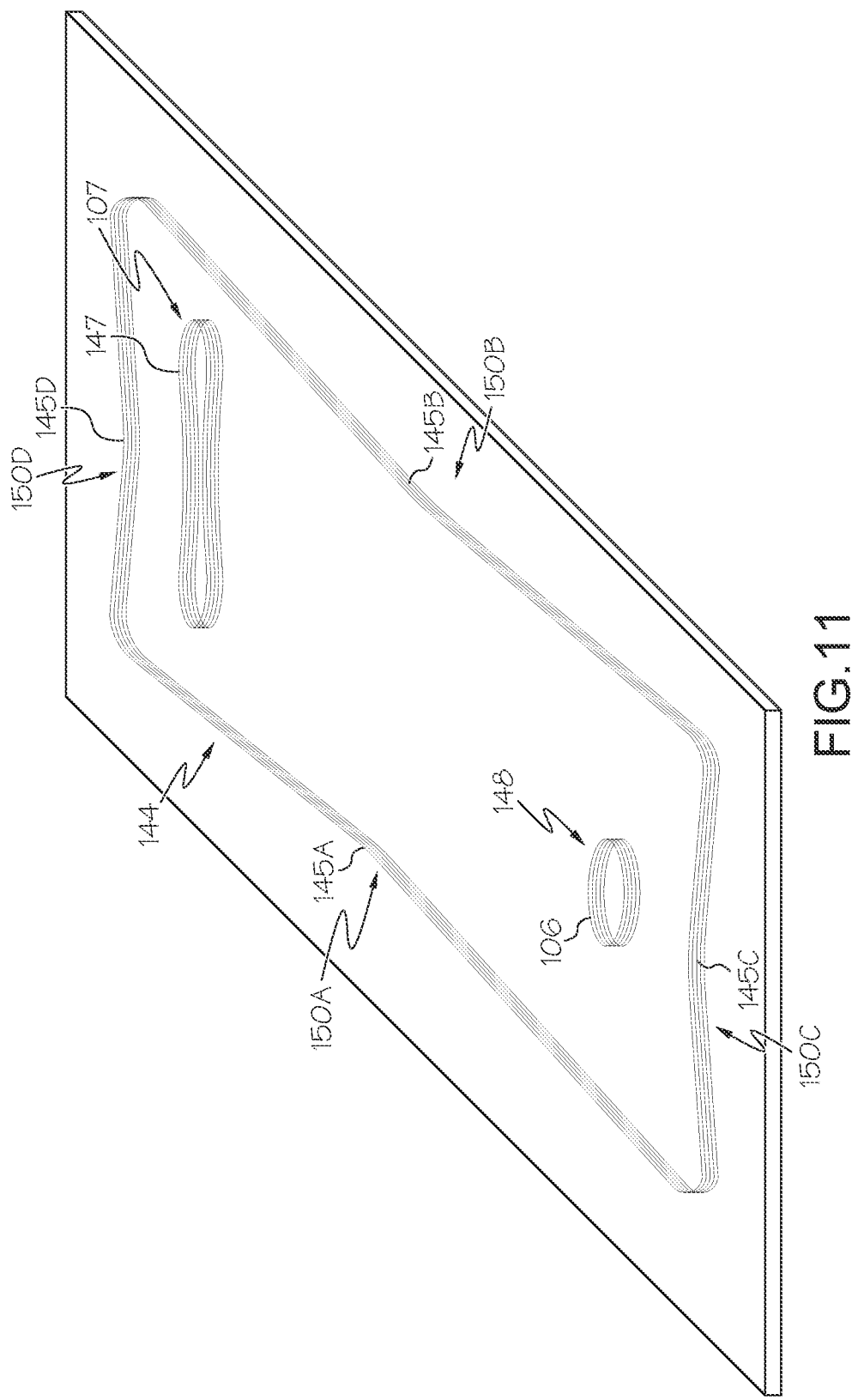
FIG. 11 schematically depicts a flat glass substrate sheet having a plurality of laser damage lines in an initial geometry corresponding to a desired shaped glass article according to one or more embodiments described and illustrated herein.

As stated above, the laser damage regions within the flat glass substrate sheet may have an initial geometry that is different from a final, desired geometry that precompensates for the changing of the shape of the flat glass substrate sheet during the reforming process at block 111. FIG. 11 schematically depicts a flat glass substrate sheet 130 having a plurality of laser damage regions 145A-145D that define a perimeter 144 of a shaped glass article, a laser damage region 148 that defines a circular through-feature 106, and a laser damage region 147 that defines a slot through-feature 107. As an example and not a limitation, the shaped glass article defined by the aforementioned through-features may be intended as a cover glass for a cellular phone, wherein the circular through-feature 106 is designed to accommodate a button, and the slot through-feature 107 is designed to accommodate a speaker.

As shown in FIG. 11, the laser damage regions 145A-145D, 147, and 148 have an initial geometry that is different from that of the desired shape of the shaped glass article 100 (see FIG. 9). More particularly, the laser damage regions 145A-145D are curved or bowed to compensate for the distortion of the flat glass substrate sheet 130 during the reforming process. As described in more detail below, the laser damage regions 145A-145D, 147 and 148 change shape along with the flat glass substrate sheet 130 such that they end up in their final, desired shape after the reforming process. Accordingly, the initial shape of the laser damage regions 145A-145D, 147 and 148 should be selected so that the final, desired shape is achieved. It should be understood that the initial shapes of the laser damage lines 145A-145D, 147 and 148 depicted in FIG. 11 are for illustrative purpose only, and that other initial shapes are also possible. It is noted that the curves of the laser damage regions depicted in FIG. 11 are exaggerated for illustrative purposes. The initial shape of the various laser damage regions may be based on a prediction of the deformation during forming and/or based on experimental deformation data.

After forming the laser damage lines, the flat glass substrate sheet 130 is three-dimensionally shaped by a reforming process (block 111 of FIG. 10). The reforming process may be any process capable of three-dimensionally shaping the flat glass substrate sheet so that the one or more glass articles have the desired shape. Such reforming processes include, but are not limited to, press molding, gravity sagging, pressure forming, and localized heating and bending.

As an example, the localized heating and bending process comprises bringing the flat glass substrate sheet to a preheated temperature that is close to the annealing point. In one non-limiting example, the flat glass substrate sheet 130 is Corning Gorilla 2318 glass in which the annealing point is about 610° C.±30° C. Then, highly localized heating is applied to local areas (e.g., local areas 150A-150B of FIG. 11) of the flat glass substrate sheet 130 that are to be bent, while most of the remaining areas of the flat glass substrate sheet 130 remain at a high viscosity. The viscosity is maintained sufficiently high so that thermal gradients imposed during local heating do not lead to mechanical instabilities or glass breakage. Moreover, to preserve the cosmetics of the shaped glass article as much as possible, no mold is in contact with the glass at low viscosities. Using the Corning Gorilla 2318 as an example, the local areas 150A-150D are brought to a localized temperature that is between about 700° C. and 780° C. The local heating rate may be between about +30° C./minute and +200° C./minute. The local areas 150A-150B are then bent by sagging or application of a bending moment. Aspects of the localized heating and bending reforming process are further described in U.S. Pat. Publ. No. 2012/0131961 entitled "Method and Apparatus for Bending a Sheet of Material into a Shaped Article" filed on Nov. 22, 2011, which is hereby incorporated by reference in its entirety.

In the reforming process that is utilized, the temperatures to which the flat glass substrate sheet is subjected to should be below the softening point of the glass material (particularly in the case of bending) so that the laser-written damage is not erased. Accordingly, the laser damage regions survive the reforming process so that they may be selectively etched during the etching process.

Figure 12:
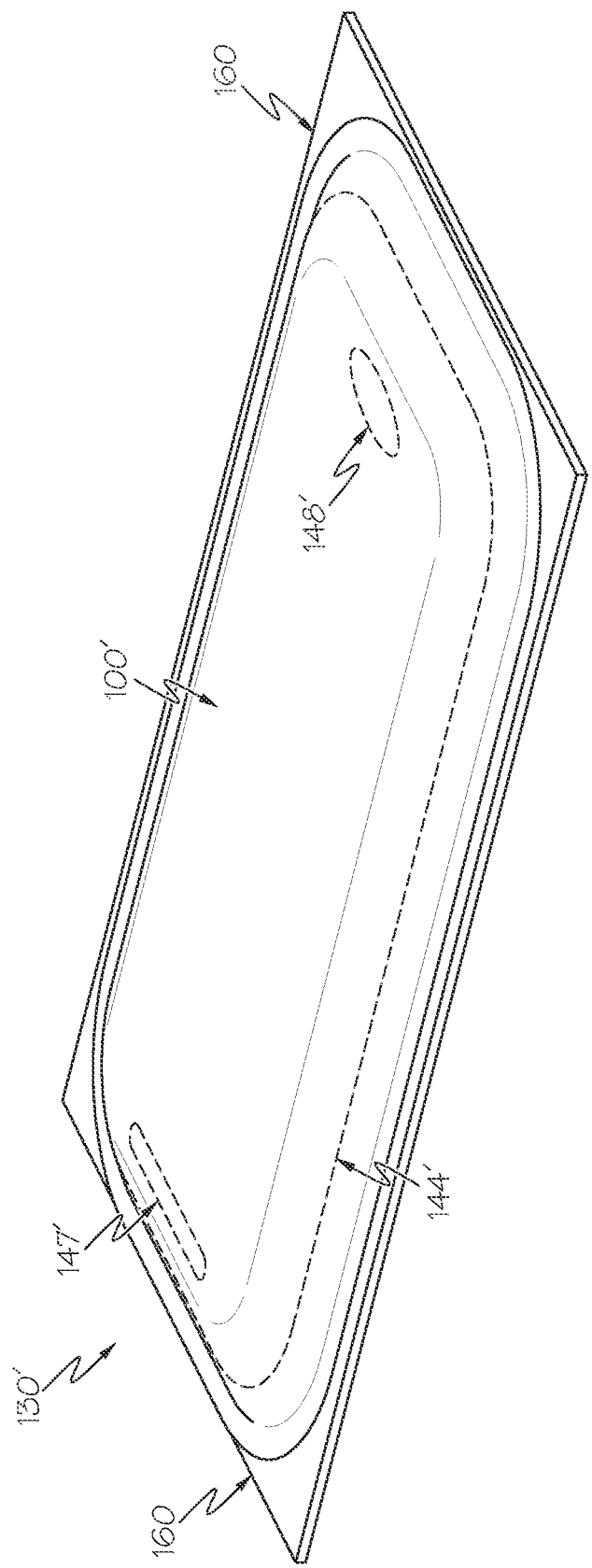
FIG. 12 schematically depicts a shaped glass substrate sheet following a reforming process according to one or more embodiments described and illustrated herein.

Referring now to FIG. 12, a shaped glass substrate sheet 130' wherein the local areas 150A-150B have been reformed to shape a glass article 100' is schematically depicted. The laser damage regions representing the perimeter 144' of the shaped glass article, as well as laser damage regions 147' and 148', have changed shape from their initial geometry into their desired geometry. Further, the shaped glass substrate sheet 130' now includes a perimeter flange portion 160 between the shaped glass article 100' and the edge of the shaped glass substrate sheet 130' that enables easy handling of the shaped glass substrate sheet 130' between and during subsequent processes. Although only a single shaped glass article is shown within shaped glass substrate sheet 130', it should be understood that one shaped glass substrate sheet may provide for multiple shaped glass articles, such as in an array of shaped glass articles. It is noted that reforming of a glass sheet to create perfectly extruded shape is often complicated because of the singularities (mechanical/thermal) of the edges. These edge singularities often induce specific defects with heterogeneities in the precise curvature profile. By removing those edges where edge defects can arise (e.g., the edges within the perimeter flange portion 160), a shaped glass article substantially free of any edge singularity may be obtained.

After the flat glass substrate sheet is reformed by the reforming process, in some embodiments the shaped glass substrate sheet may then be annealed to remove internal stresses generated during the fabrication of the flat glass substrate sheet and/or the reforming process (block 112 of FIG. 10). Any appropriate annealing process may be utilized, such as passing the shaped glass substrate sheet through a Lehr.

Figure 13:
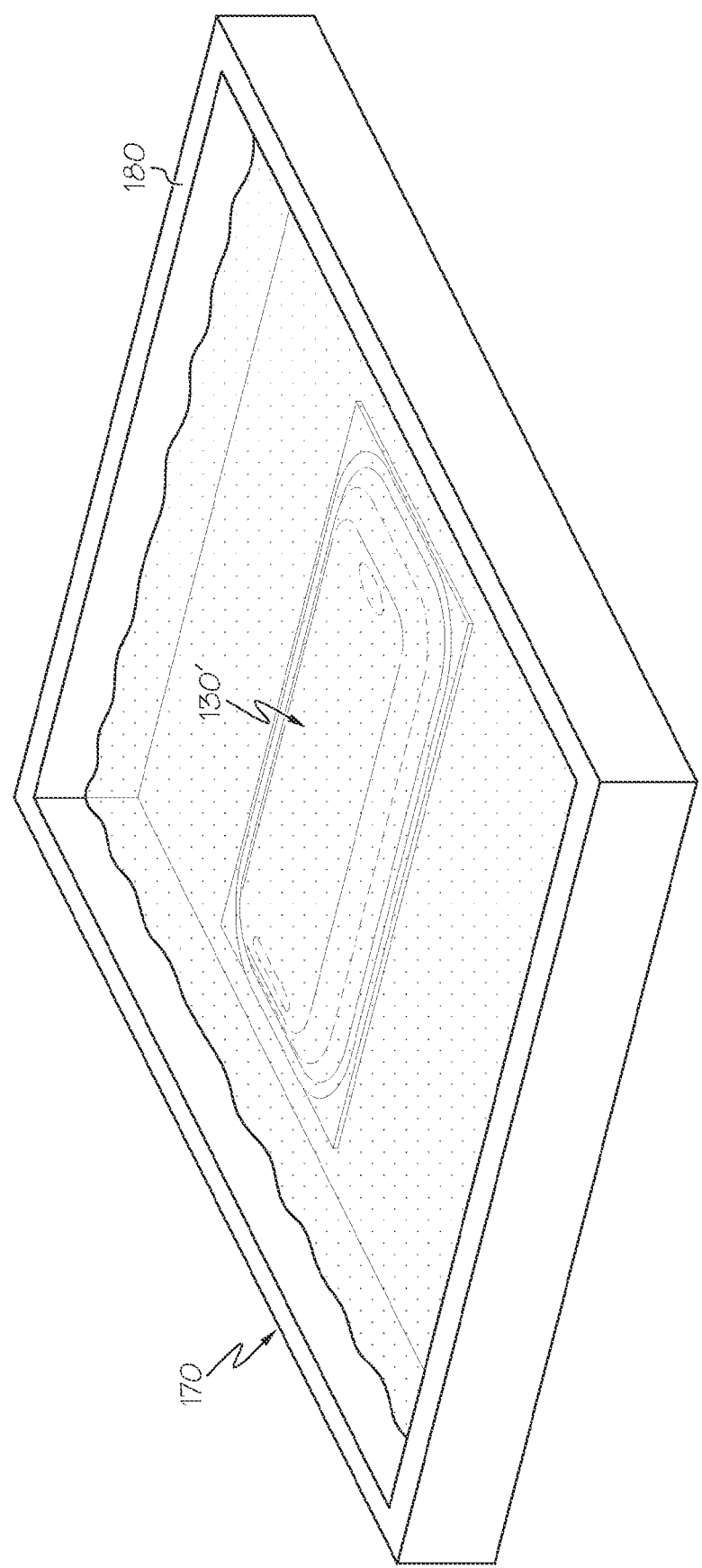
FIG. 13 schematically depicts a shaped glass substrate sheet in an etchant bath of etchant solution according to one or more embodiments described and illustrated herein.

Embodiments of the present disclosure separate shaped glass articles and/or create through-features by subjecting the laser-written shaped glass substrate sheet to an etching process (block 113 of FIG. 10). FIG. 13 schematically depicts the shaped glass substrate sheet 130' of FIG. 12 submerged in etchant solution 180 of an etchant bath 170.

As stated above, the etchant solution preferentially etches the laser damage regions (numbered 140 in FIG. 13) because of the presence of microcracks within these laser damage regions. Both the laser damage regions and the non-damaged regions are etched simultaneously, but at different etch rates. The microcracks of the laser damage regions break chemical bonds, and provide pathways for etchant to penetrate deeper into the glass substrate sheet. Therefore, the etch rate at the laser damage regions is much faster than then non-damaged regions. Accordingly, the shaped glass article may be cut or otherwise removed from the remaining portion of the shaped glass substrate sheet 130' when the etchant solution fully etches the laser damage regions. Further, through-features, such as holes and slots, may also be fabricated in this manner.

Thus, in one embodiment, an alkali-aluminosilicate shaped glass substrate sheet 130' is placed in an etchant bath 170 of etchant solution 180 that is agitated with a frequency of about 40 kHz and maintained at a temperature that is less than 20° C. The etchant solution comprises a concentration of hydrofluoric acid between about 1M and about 3M and hydrochloric acid. When the concentration of hydrofluoric acid is greater than about 2M, the concentration of hydrochloric acid is less than about 1M. When the concentration of hydrofluoric acid is around 1M, the concentration of hydrochloric acid is between about 1M and about 3M. The hydrochloric acid may be substituted by sulfuric acid or nitric acid.

After the shaped glass articles 100 have been separated from the glass substrate sheet and the through features have been formed, the shaped glass articles 100 (see FIG. 9) may be further processed. In some embodiments, the shaped glass articles are strengthened by a strengthening process (block 114 of FIG. 10). The shaped glass articles 100 may be chemically strengthened by an ion exchange process in which ions in the surface layer of the glass are replaced by larger ions having the same valence or oxidation state. In one particular embodiment, the ions in the surface layer and the larger ions are monovalent alkali metal cations, such as $Li^+$ (when present in the glass), $Na^+$, $K^+$, $Rb^+$, and $Cs^+$. Alternatively, monovalent cations in the surface layer may be replaced with monovalent cations other than alkali metal cations, such as $Ag^+$, $Tl^+$, $Cu^+$, or the like.

Figure 14:
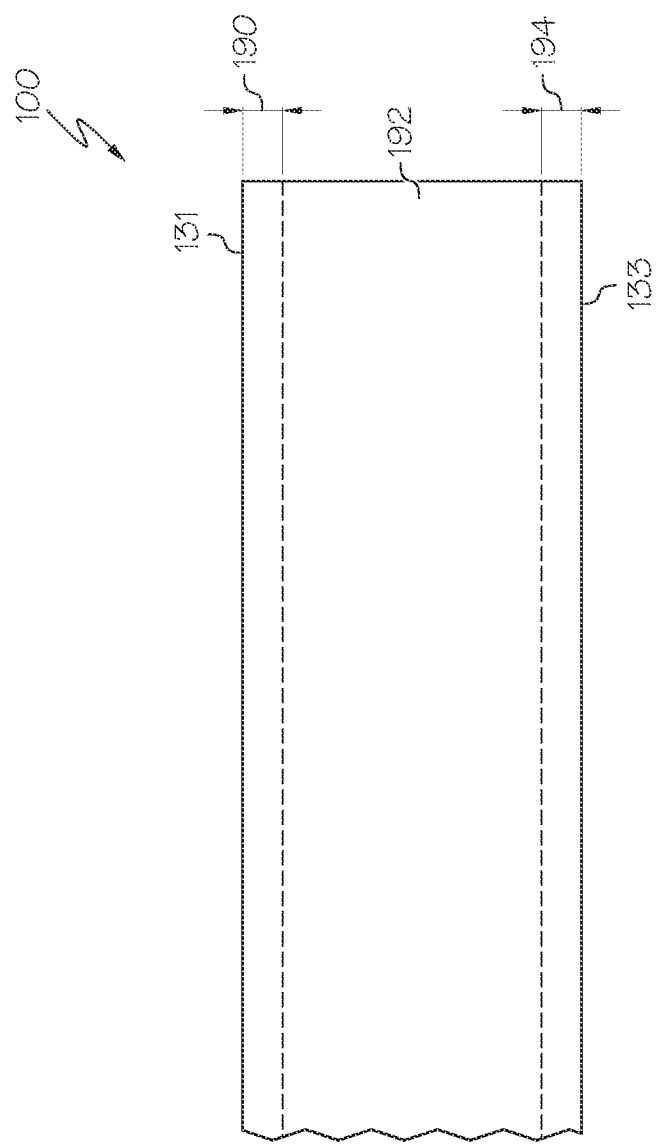
FIG. 14 schematically depicts a partial side view of a strengthened shaped glass article having two compressive surface layers according to one or more embodiments described and illustrated herein.

FIG. 14 schematically depicts a portion of strengthened, shaped glass article 100. In one embodiment, the shaped glass article is chemically strengthened by ion-exchange in which smaller sodium ions near the surface of the glass are exchanged with larger potassium ions when the shaped glass article is placed in an ion exchange bath. Replacement of the smaller sodium ions with the larger potassium ions causes a layer of compressive stress to develop in the surfaces of the shaped glass article. The compressive stress extends below the surfaces of the shaped glass article to a specified depth of layer (compressive surface layer). A compressive surface layer extends from the upper surface 131 (i.e., a first compressive surface layer 190) and the underside surface 133 (i.e., a second compressive surface layer 194) to the depth of layer. The compressive surface layer is balanced by the development of the internal tension layer 192 at the center of the shaped glass article.

Finally, the strengthened, shaped glass articles may be subjected to further processing depending on the intended application (block 115). In some embodiments, although the etching process removes most of any edge defects that may be present, mechanical edge finishing may be performed. Additionally, additional layers may be applied to the shaped glass articles, such as touch-sensitive layers, antireflective layers, antiglare layers, and the like.

It should now be understood that embodiments described herein are directed to methods of fabricating three-dimensional glass articles from a flat glass substrate sheet using laser damage and chemical etching processes. Laser damage regions are formed within a flat glass substrate sheet around edges of one or more desired glass articles to be separated from the flat glass substrate sheet, as well as formed around through-features (e.g., slots, holes, and the like) of the one or more desired glass articles. The flat glass substrate sheet is reformed to achieve the desired three-dimensional shape of the one or more glass articles. The laser damage regions are formed with an initial geometry that precompensates for the changing shape of the flat glass substrate sheet during the reforming process such that laser damage regions have a desired geometry after the reforming process. During etching, the laser damage regions are preferentially etched when the glass substrate sheet is subjected to an etchant solution. The embodiments described herein may simplify the fabrication of three-dimensional glass articles. Forming the laser damage regions in a flat glass substrate sheet prior to the reforming process eliminates additional lifting and rotational movements of the glass part (assuming the laser is static) that are required when laser machining a shaped glass substrate sheet (e.g., formation of laser damage regions after the reforming process). Accordingly, machining a flat glass substrate sheet may allow for simpler equipment and higher run rates. Compared with CNC machining, selective etching of laser damage regions results in higher edge strength of the shaped glass article because etching reduces the depth of flaws as well as blunts them.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method of forming a glass article, comprising:
providing a glass substrate sheet;
translating a pulsed laser beam on the glass substrate sheet to form a laser damage region extending from a first surface of the glass substrate sheet to a second surface of the glass substrate sheet, wherein:
the laser damage region comprises a plurality of defect lines, wherein each defect line is formed at a different depth of the glass substrate sheet; and
applying the glass substrate sheet with an etchant solution comprising about 1M to about 3M of hydrofluoric acid and hydrochloric acid, wherein:
a concentration of the hydrochloric acid is less than about 1M if a concentration of the hydrofluoric acid is greater than about 2M; and
the concentration of the hydrochloric acid is between about 1M and about 3M if the concentration of the hydrofluoric acid is less than about 2M.

2. The method of claim 1, wherein the glass substrate sheet is strengthened before the pulsed laser beam is translated on the glass substrate sheet, and wherein the pulsed laser has a power of from about 0.1 W to about 0.4 W.

3. The method of claim 1, wherein the glass substrate sheet is strengthened after the pulsed laser beam is translated on the glass substrate sheet, and wherein the pulsed laser has a power of from about 0.4 W to about 0.6 W.

4. The method of claim 1, wherein an acid-resistant coating is applied to the glass substrate sheet before the pulsed laser beam is translated on the glass substrate sheet, and wherein the acid-resistant coating is removed from the glass substrate sheet after the pulsed laser beam is translated on the glass substrate sheet.

5. The method of claim 1, wherein an acid-resistant coating comprising ethylene acrylic acid, wax polymer, and water is applied to the glass substrate sheet.

6. The method of claim 1, wherein an acid-resistant coating having a thickness of from about 1 μm to about 15 μm is applied to the glass substrate sheet.

7. The method of claim 1, wherein the glass substrate sheet comprises from about 5 mol % to about 14 mol % alkaline earth metal oxides.

8. The method of claim 1, wherein the laser damage region does not contact an edge of the glass substrate sheet.

9. The method of claim 1, wherein applying the etchant solution to the glass substrate sheet comprises spraying the glass substrate sheet with the etchant solution.

10. The method of claim 1, wherein applying the etchant solution to the glass substrate sheet comprises submerging the glass substrate sheet in a bath of the etchant solution, wherein
a temperature of the bath of the etchant solution is less than about 30° C.; and
the bath of the etchant solution is agitated at an ultrasonic agitation frequency of about 40 kHz until a portion of the glass substrate sheet about the laser damage region is substantially removed, thereby forming the shaped glass article.

11. The method of claim 1, wherein:
the pulsed laser beam is translated on the glass substrate sheet at multiple passes; and
a focus of the pulsed laser beam is modified at each pass such that the laser damage region is defined by a plurality of laser damage lines extending from the first surface to the second surface within a bulk of the glass substrate sheet.

12. The method of claim 1, wherein the pulsed laser beam has a wavelength in the ultraviolet spectrum and a power of about 0.1 W to about 2.0 W.

13. The method of claim 1, further comprising strengthening the glass substrate sheet by an ion-exchange strengthening process.

14. The method of claim 1, further comprising coating the glass substrate sheet with an acid-resistant coating.

15. A method of forming a shaped glass article, comprising:
providing a glass substrate sheet;
translating a pulsed laser beam on the glass substrate sheet to form a laser damage region between a first surface and a second surface of the glass substrate sheet, wherein the laser damage region comprises an initial geometry;
reforming the glass substrate sheet to form a bend at a local area of the glass substrate sheet, wherein:
at least a portion of the laser damage region is within the local area; and
a geometry of the laser damage region changes from the initial geometry to a desired geometry following the reforming of the glass substrate sheet such that the initial geometry of the laser damage region compensates for the bending of the glass substrate sheet; and
applying an etchant solution to the glass substrate sheet to remove a portion of the glass substrate sheet about the laser damage region to form the glass article.

16. The method of claim 15, wherein the glass substrate sheet is reformed by:
preheating the glass substrate sheet to a preheated temperature; and
heating the local area of the glass substrate sheet to a localized temperature that is greater than the preheated temperature, thereby bending the glass substrate sheet at the local area,
wherein the preheated temperature and the localized temperature are lower than a softening point of the glass substrate sheet.

17. The method of claim 15, wherein:
the pulsed laser beam has a wavelength that is in the ultraviolet spectrum; and
a power of the pulsed laser beam is between about 0.5 W and about 2.0 W.

18. The method of claim 15, wherein:
the pulsed laser beam is translated on the glass substrate sheet at multiple passes; and
a focus of the pulsed laser beam is modified at each pass such that the laser damage region is defined by a plurality of laser damage lines extending from the first surface to the second surface within a bulk of the glass substrate sheet.

19. The method of claim 18, wherein adjacent laser damage lines of the plurality of laser damage lines are offset with respect to one another.

20. The method of claim 18, wherein a position of the pulsed laser beam with respect to the glass substrate sheet is adjusted at each pass such that the plurality of laser damage lines define a curve within the bulk of the glass substrate sheet from the first surface of the glass substrate sheet to the second surface of the glass substrate sheet.

21. The method of claim 18, wherein the shaped glass article is strengthened by an ion-exchange strengthening process.

22. A method of forming a shaped glass article, comprising:
providing a glass substrate sheet;
translating a pulsed laser beam on the glass substrate sheet to form a laser damage region extending from a first surface of the glass substrate sheet to a second surface of the glass substrate sheet, wherein:
the laser damage region comprises a plurality of defect lines, wherein each defect line is formed at a different depth of the glass substrate; and
the laser damage region comprises an initial geometry;
submerging the glass substrate sheet in a bath of etchant solution comprising about 1M to about 3M of hydrofluoric acid and hydrochloric acid, wherein:
a concentration of the hydrochloric acid is less than about 1M if a concentration of the hydrochloric acid is greater than about 2M;
the concentration of the hydrochloric acid is between about 1M and about 3M if the concentration of the hydrochloric acid is less than about 2M; and
agitating the bath of etchant solution until a portion of the glass substrate sheet about the laser damage region is substantially removed, thereby forming the shaped glass article.

23. The method of claim 22, wherein the pulsed laser beam has a wavelength in the ultraviolet spectrum and a power of about 0.5 W to about 2.0 W.

24. The method of claim 22, wherein a temperature of the bath of etchant solution is less than about 30° C.

25. The method of claim 22, wherein the bath of etchant solution is agitated at an ultrasonic agitation frequency of about 40 kHz.

26. A glass article comprising:
a glass wafer comprising a surface with an antireflective coating; and
an interposer adhered to the surface of the glass wafer comprising the antireflective coating, and comprising a plurality of through holes, wherein;
the interposer is not chemically strengthened, and
the interposer has a failure rate of about 50% at a force of about 5 kg measured using a ring-on-ring test.

* * * * *